(12) United States Patent
Hendrickson et al.

(10) Patent No.: US 10,407,591 B2
(45) Date of Patent: Sep. 10, 2019

(54) LOW SOLIDS SURFACE COATING COMPOSITIONS AND USE THEREOF

(71) Applicant: ECOLAB USA INC., Saint Paul, MN (US)

(72) Inventors: Evan Hendrickson, St. Louis Park, MN (US); Ramakrishnan Balasubramanian, Stillwater, MN (US); Andrew Wold, Bloomington, MN (US); Robert D. P. Hei, Baldwin, WI (US)

(73) Assignee: Ecolab USA Inc., Saint Paul, MN (US)

( * ) Notice: Subject to any disclaimer, the term of this patent is extended or adjusted under 35 U.S.C. 154(b) by 0 days.

(21) Appl. No.: 14/557,617

(22) Filed: Dec. 2, 2014

(65) Prior Publication Data

US 2016/0152864 A1    Jun. 2, 2016

(51) Int. Cl.
| | | |
|---|---|---|
| *C09D 175/04* | (2006.01) | |
| *C09D 7/63* | (2018.01) | |
| *E04F 15/00* | (2006.01) | |
| *C08K 5/5419* | (2006.01) | |

(52) U.S. Cl.
CPC ............. *C09D 175/04* (2013.01); *C09D 7/63* (2018.01); *E04F 15/00* (2013.01); *C08K 5/5419* (2013.01); *Y10S 901/01* (2013.01)

(58) Field of Classification Search
CPC .... B05D 2503/00; C09D 175/00; C09D 7/63; E04F 15/00; C08K 5/5419; Y10S 901/01
USPC ...................................................... 427/385.5
See application file for complete search history.

(56) References Cited

U.S. PATENT DOCUMENTS

| | | |
|---|---|---|
| 5,921,843 A | 7/1999 | Skrivan et al. |
| 6,017,163 A | 1/2000 | Keppers et al. |
| 6,046,565 A | 4/2000 | Thorne |
| 6,827,433 B2 | 12/2004 | Takemoto et al. |
| 7,063,474 B2 | 6/2006 | DeFields et al. |
| 7,100,726 B2 | 9/2006 | Thorne |
| 7,378,381 B2 | 5/2008 | Arai et al. |
| 7,832,048 B2 | 11/2010 | Harwig et al. |
| 8,033,063 B2 | 11/2011 | Won |
| 8,127,396 B2 | 3/2012 | Mangiardi |
| 8,246,263 B2 | 8/2012 | Bober et al. |
| 8,366,336 B2 | 2/2013 | Bober et al. |
| 8,480,856 B2 | 7/2013 | Banks et al. |

(Continued)

FOREIGN PATENT DOCUMENTS

| | | |
|---|---|---|
| EP | 0508536 A1 | 10/1992 |
| EP | 1383815 B1 | 1/2004 |

(Continued)

OTHER PUBLICATIONS

BYK-Chemie GmbH, "BYK-347 Data Sheet," www.byk.com/additives, Feb. 2013, 2 pages.
The Dow Chemical Company, "Technical Data Sheet: Butyl Carbitol Solvent," www.dow.com, Form No. 110-00624-0812, Published 2012, 2 pages.

(Continued)

*Primary Examiner* — Robert S Walters, Jr.
(74) *Attorney, Agent, or Firm* — McKee, Voorhees & Sease, PLC

(57) ABSTRACT

The present invention is directed to low solid surface coating compositions and methods of using the same. The low solid surface coating compositions comprise a self-crosslinking polymer, a solvent, a surfactant, and water. The low solid surface coating compositions can preferably have a total solid content of less than 15%.

18 Claims, 12 Drawing Sheets

(56) References Cited

U.S. PATENT DOCUMENTS

| | | | |
|---|---|---|---|
| 2011/0202175 A1* | 8/2011 | Romanov | A47L 11/4011 700/250 |
| 2012/0031577 A1 | 2/2012 | Banks et al. | |
| 2012/0107508 A1* | 5/2012 | Li | C09D 175/04 427/355 |
| 2013/0164450 A1* | 6/2013 | Hobbs | B05D 3/12 427/371 |

FOREIGN PATENT DOCUMENTS

| | | |
|---|---|---|
| EP | 1717281 B1 | 11/2006 |
| WO | 2009067382 A1 | 5/2009 |
| WO | 2009114750 A1 | 9/2009 |
| WO | 2013043780 A1 | 3/2013 |

OTHER PUBLICATIONS

Evonik Industries AG, "Tego Glide 410—slip and anti-blocking additive," www.tego.de, Aug. 2014, 1 page.

The Lubrizol Corporation, "Technical Data Sheet: Permax 230—Aliphatic Polyether Waterborne Polyurethane Dispersion," www.lubrizolcoatings.com, Jun. 4, 2007, 1 page.

The Lubrizol Corporation, "Sancure 970—NMP/NEP-Free Polyurethane Composite Dispersion," www.lubrizol.com/wood, Oct. 2012, 2 pages.

Vielhauer, Laura, Leo Procopio, Eric Greyson and Andrew Hejl, "Self-Crosslinking Acrylic and Acrylic/Polyurethane Resins for Waterborne Wood Finishes," reprinted from Paint & Coatings Industry magazine, May 2013, 8 pages.

\* cited by examiner

LOW SOLIDS SURFACE COATING COMPOSITIONS AND USE THEREOF

FIELD OF THE INVENTION

The invention relates to low solid coatings for surfaces. In particular, low solid floor coatings for use with robotic devices.

BACKGROUND OF THE INVENTION

In many industrial and commercial businesses, cleaning and maintenance of the surfaces, in particular floors, is an ongoing endeavor. Grocery stores, food production facilities, commercial kitchens, commercial laundry facilities, hotels, restaurants, office buildings, and public restrooms are examples of facilities where the upkeep of the floor is a continuing occupation. The presence of spills, dirt, or other floor conditions can affect the safety of persons in the area, contribute to an unsightly environment, and/or increase wear and tear on the floor itself.

Recently there has been development of robotic floor monitoring devices that monitor the condition of floors. The floor monitoring device may traverse a route around an environment and collect data concerning the condition of the floor. The device may communicate the floor condition data to a base station, a local computer, or other computing device. In some examples, the floor monitoring device may analyze the floor condition data and identify any notable floor conditions within the monitored environment. In other examples, the base station may analyze the floor condition data and identify and/or address notable floor conditions within the monitored environment. An example of such a device is provided in (Ser. No. 13/828,719) directed at robotic systems and methods for monitoring floor conditions, which is fully incorporated herein as it is set forth in its entirety.

Traditional floor coatings contain high solid content, including at least 16% solid content. Some high solid content coatings can even be as great as 60% solid content. High solid coatings are applied by mopping or a similar type of method of application. Mopping and similar methods of application are not suitable for some robotic coating devices and not ideal for other robotic coating devices. A preferred method of applying a floor coating with a robotic coating device is by spray application. However, high solid content coatings are not suitable for spray application as they are difficult to spray, there is the possibility of agglomeration and clogging in the spray apparatus, and the increased viscosity does not allow adequate dispersion and coating on the floor. There is a need for floor coatings that do not retain tread marks, particularly from application of a robotic device, or black heel marks.

Accordingly, it is an objective of the claimed invention to develop low solids surface coatings.

A further object of the invention is to provide a low solids surface coating that has low viscosity and can be applied by a spray mechanism.

A further object of the invention is to provide a low solids floor coating that can be applied by robotic floor coating devices.

Other objects, advantages and features of the present invention will become apparent from the following specification taken in conjunction with the accompanying drawings.

BRIEF SUMMARY OF THE INVENTION

An advantage of the invention is to provide a low solids surface coating composition. It is a further advantage of the invention to provide a low solids surface coating composition with a low viscosity that can be applied by a spray mechanism. It is another advantage of the present invention to provide a low solids floor coating composition that can be applied with a robotic floor coating device. Low solids floor coatings make this achievable as they do not require the same degree of manual oversight and application.

In an embodiment, the low solid surface coating compositions comprise a polymer, a solvent, a surfactant, and water and have a solid content of less than 15%. In an embodiment of the low solid surface coating compositions, the polymer comprises a self-crosslinking polymer.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
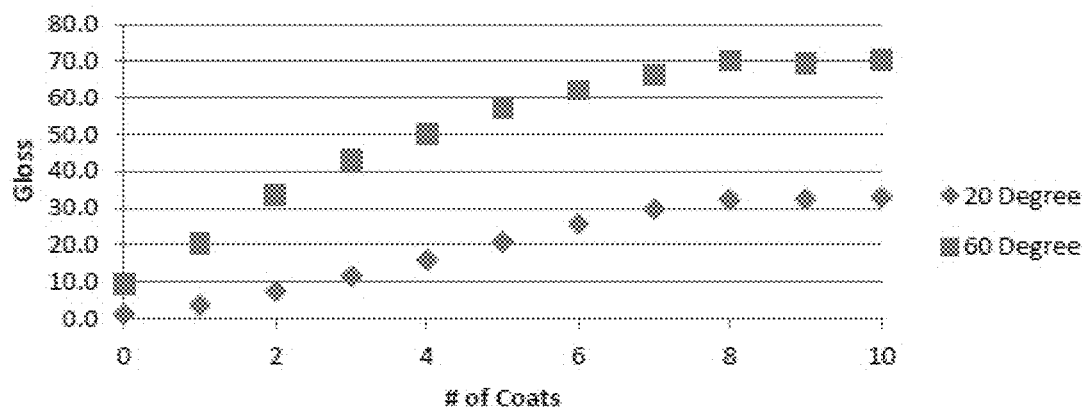
FIG. 1 shows the gloss measurements for Turboset 1 after the application of numerous coatings.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

The present invention relates to low solids surface coatings. The low solids surface coatings have many advantages over existing surface coatings. For example, the low solids surface coatings can be applied using a spray mechanism. In some embodiments, the low solids surface coating compositions can be applied by robotic devices, including, robotic floor coating devices.

The embodiments of this invention are not limited to particular method of applying a surface coating. In embodiments of the invention that are compatible with robotic coating devices, the invention is not limited by any type of robotic devices or robotic methods of applying the compositions, which can vary. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

All numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

The term "CARB-compliant" as used herein refers to something that is in compliance with the California Air Resources Board regulations, including Volatile Organic Compound (VOC) regulations.

The term "surface" refers to a rubber surfaces and solid, substantially non-flexible surfaces such as a floor, counter top, hardwood, tile, wall, panel, window, plumbing fixture, kitchen and bathroom furniture, appliance, engine, and dish. Surfaces may include for example, floors, walls, gym floors, health care surfaces, and food processing surfaces.

As used herein, the term "polymer" generally includes, but is not limited to, homopolymers, copolymers, such as for example, block, graft, random and alternating copolymers, terpolymers, and higher "x"mers, further including their derivatives, combinations, and blends thereof. Furthermore, unless otherwise specifically limited, the term "polymer" shall include all possible isomeric configurations of the molecule, including, but are not limited to isotactic, syndiotactic and random symmetries, and combinations thereof. Furthermore, unless otherwise specifically limited, the term "polymer" shall include all possible geometrical configurations of the molecule.

As used herein, the term "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "threshold agent" refers to a compound that inhibits crystallization of water hardness ions from solution, but that need not form a specific complex with the water hardness ion. Threshold agents include but are not limited to a polyacrylate, a polymethacrylate, an olefin/maleic copolymer, and the like.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods, systems, apparatuses, and compositions of the present invention may comprise, consist essentially of, or consist of the components and ingredients of the present invention as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

It should also be noted that, as used in this specification and the appended claims, the term "configured" describes a system, apparatus, or other structure that is constructed or configured to perform a particular task or adopt a particular configuration. The term "configured" can be used interchangeably with other similar phrases such as arranged and configured, constructed and arranged, adapted and configured, adapted, constructed, manufactured and arranged, and the like.

Compositions

According to an embodiment of the invention, low solid surface coatings comprise, consist of and/or consist essentially of a polymer, a solvent, and a surfactant. In a further aspect, the low solid surface coatings comprise, consist of and/or consist essentially of a self-crosslinking polymer, a solvent, and an organo-fluorine, silicone based surfactant, and/or silicone emulsion. In an aspect of the invention, the low solid surface coating can be a one part system—employ a self-crosslinking polymer. Moreover, in a preferred embodiment the compositions have a solid contents of 15% or less, more preferably 10% or less, even more preferably 8% or less, and most preferably 5% or less, by weight of the total composition.

Examples of suitable formulations for low solid surface coating compositions according to the invention are shown below in the following table.

| Ingredient | First Exemplary Range (wt. %) | Second Exemplary Range (wt. %) | Third Exemplary Range (wt. %) |
| --- | --- | --- | --- |
| Polymer | 1-25 | 5-20 | 10-15 |
| Solvent | 0.01-5 | 0.05-2 | 0.1-1.7 |
| Surfactant | 0.01-5 | 0.05-1 | 0.07-0.5 |
| Water | 70-98.98 | 75-95 | 80-90 |

Polymer

The low solid surface coating compositions include one or more polymers. The polymers useful for the low solid surface coating compositions are self-crosslinking polymers. Many different self-crosslinking polymers can be used in the compositions, including, but not limited to, acrylic polymers, UV-cured polymers, nylons, epoxies, polyesters, polyvinyls, polyacrylates, polyurethanes, polyureas, or combinations of the same. In a preferred embodiment, the self-crosslinking polymer comprises acrylic polymers, polyurethane or polyurethane-forming polymers, polyacrylates or polyacrylate-forming polymers, and copolymers or terpolymers of the same. Preferred self-crosslinking polymers are water-borne. In embodiments of the invention multiple polymers may be employed in the composition. In an aspect of the invention, polymers may be selected for particular applications. For example, polymers may be selected to provide high gloss or soil resistance. A preferred polymer for providing high gloss is a modified styrene butadiene polymer emulsion, including Omna-Glo™ 100 available from Omnova Solutions.

In an aspect, the polymers include 70% or less solid content, preferably less than 50% solid content, more preferably between about 30% and 45% solid content.

Preferred self-crosslinking polyurethanes include those sold under the trade names Turboset™ and Sancure® by Lubrizol Corp. of Wickliffe, Ohio. In a preferred embodiment, the compositions are substantially free of polymers that are not self-crosslinking (two-part system polymers). Preferred crosslinkers include aziridines and isocyanates.

The low solid surface coating compositions preferably include from about 1 wt-% to about 25 wt-% polymer, more preferably from about 5 wt-% to about 20 wt-% polymer, and even more preferably from about 10 wt-% to about 15 wt-% polymer. In an aspect of the invention, the amount of polymer added to the composition can, in part, be determined by the amount of solid content desired in the low solid surface coating composition. The low solid surface coating composition preferably 10% or less solid content; more preferably 8% or less solid content; even more preferably 5% or less solid content. Throughout the disclosure formulations are referred to by their solid percent content as a prefix to the polymer. For example, 5% Turboset refers to a composition that has a solid content of 5%; it is not a description of the weight percent of the polymer in the composition, weight percentages are described as such.

Solvents

The low solid surface coating compositions include one or more solvents. Suitable solvents have good flow (rheology) properties and a quick-dry properties. In a preferred embodiment, the solvents suitable for the low solid floor coating compositions are CARB compliant. In an aspect the selection of solvents and/or amount of solvent added to the low solids surface coating composition can be, in part, be determined by the desired viscosity of the low solid surface coating composition. In a preferred embodiment the low solids surface coating composition has a viscosity less than 15 cps, more preferably less than 10 cps, even more preferably 7 cps or less, and most preferably 5 cps or less. Various types of solvents can be suitable for use in the low solid surface coating compositions, provided that the resulting composition has desired flow and evaporation properties. Preferred solvents will not result in various coating defects such as fisheyes, poor leveling, etc. In an embodiment of the invention, preferred solvents include those that are hydrophilic, providing at least 80% water solubility, more preferably providing at least 90% water solubility, most preferably providing at least 98% water solubility.

Exemplary preferred solvents include glycol ethers, esters, alcohols, ketones. Preferred glycol ethers include, for example, diethylene glycol mono butyl ether, diethylene glycol monoethyl ether, and dipropylene glycol n-butyl ether. A preferred diethylene mono butyl ether is Butyl Carbitol available from Dow Chemical.

The low solid surface coating compositions preferably include from about 0.01 wt-% to about 5 wt-% solvent, more preferably from about 0.05 wt-% to about 1 wt-% solvent, and even more preferably from about 0.07 wt-% to about 1.7 wt-% solvent.

Surfactants

In some embodiments, the compositions of the present invention include one or more surfactants, which can include emulsions and colloids providing surface activity. Surfactants suitable for use with the compositions of the present invention include, but are not limited to, nonionic surfactants, anionic surfactants, and zwitterionic surfactants. In an embodiment of the inventions, anionic surfactants are preferred. Suitable surfactants include organo-fluorine, silicone-based surfactants, and/or silicone emulsions and colloids. In a preferred embodiment of the invention, the surfactants are modified by silicone containing group, such as, a siloxane group. In a preferred embodiment the surfactant comprises a polyether-modified siloxane emulsion.

Exemplary organo-fluorine surfactants include the Capstone® fluorosurfactants available from DuPont™. A particularly preferred organo-fluorine surfactant available in the Capstone® fluorosurfactants is FS-60. Exemplary surfactants including a siloxane group include BYK 347 and BYK 348 available from Altana, and Tego® Glide 410 available from Evonik Indus.

The low solid surface coating compositions preferably include from about 0.01 wt-% to about 5 wt-% surfactant, more preferably from about 0.05 wt-% to about 1 wt-% surfactant, and even more preferably from about 0.07 wt-% to about 0.5 wt-% surfactant.

Water

The low solids surface coating compositions include water. In an embodiment of the invention, the water is in an amount between about 70 wt-% and about 98.98 wt-%, preferably between about 75 wt-% and about 95 wt-%, and more preferably between about 80 wt-% and about 90 wt-%.

Additional Functional Ingredients

The components of the low solids surface coating compositions can further be combined with various functional components suitable for use in surface coatings. In some embodiments, the low solids surface coating compositions can including the polymer, solvent, surfactant, and water make up a large amount, or even substantially all of the total weight of the low solids surface coating compositions. For example, in some embodiments few or no additional functional ingredients are added.

In other embodiments, additional functional ingredients may be included in the low solids surface coating compositions. The functional ingredients provide desired properties and functionalities to the compositions. For the purpose of this application, the term "functional ingredient" includes a material that provides a beneficial property in a particular embodiment. Some particular examples of functional materials are discussed in more detail below, although the particular materials discussed are given by way of example only, and that a broad variety of other functional ingredients may be used.

In other embodiments, the compositions may include leveling agents, waxes, fragrances, dyes, polishes, corrosion inhibitors, plasticizers, fungicides and biocides, friction modifiers such as alkyl polyglucosides, metal complexes, rheology modifiers or thickeners, and the like. A preferred plasticizer is tributoxyethyl phosphate.

Storage

Embodiments of the invention have improved shelf-life over other surface coatings, including, in particular floor coatings. For example, in a preferred embodiment the low solids surface coating compositions have a shelf-life of at least 6 months, more preferably at least one year.

Methods of Use

While an understanding of the mechanism is not necessary to practice the present invention and while the present invention is not limited to any particular mechanism of action, it is contemplated that, in some embodiments, the low solid surface coating compositions can be applied by pouring, mopping, spraying, and/or wiping. In a preferred embodiment the low solids surface coating compositions are applied to a floor using a robotic floor coating device as described in (Ser. No. 13/828,719).

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

The materials used in the following Examples are provided herein:

Turboset™ 2027: a self-crosslinking polyurethane polymer, available from Lubrizol.

Permax™ 232: a water-borne polyurethane non-self crosslinking polymer, available from Lubrizol.

Sancure® 970: a non-self-crosslinking polyurethane polymer, available from Lubrizol.

Butyl Carbitol: monobutyl ether, available from Dow Chemical.

BYK 347: a polyether-modified siloxane surfactant, available from Altana.

Tego® Glide 410: a siloxane surfactant, available from Evonik Indus.

Omna-Glo™ 100: a modified styrene butadiene polymer emulsion, available from Omnova Solutions.

Example 1

Basic Characteristics of Low Solids Polyurethane Finishes

The purpose of this example was to determine basic characteristics, such as dry time, gloss and adhesion, of three separate polyurethane polymers based floor finishes: Turboset 2027, Permax 232, and Sancure 970. These finishes were selected for testing based on their low (less than 5%) percent solids.

Samples were prepared of each type by first determining the percent solids of each finish using a moisture analyzer. The results are shown in Table 1.

TABLE 1

| Finish | Percent Solids (%) |
| --- | --- |
| Turboset 2027 | 40 |
| Permax 232 | 33 |
| Sancure 970 | 42 |

From this information, two 1%, 2%, and 5% solids solutions of Permax 232 and Sancure 970 were created; one that was 20 gram total weight and one that was 60 gram total weight. Each polymer was diluted using soft (0-grain) water and mixed well by hand. Two separate 5% Turboset 2027 solutions were created with compositions shown in Table 2.

TABLE 2

| Component | Low Solid Turboset Formula 1 | Low Solid Turboset Formula 2 |
| --- | --- | --- |
| Water | 82.39 | 86.39 |
| Turboset 2027 | 12.50 | 12.50 |
| Butyl Carbitol | 5.00 | 1.00 |
| BYK 347 | 0.11 | 0.11 |

These finishes were stirred by a mixer for 1 hour after addition of all components and then bottled and allowed to sit overnight before applying the first coating.

Eight scrubbed black VCT tiles were prepared for testing by being cut into four 6 in. by 6 in. square tiles. Each tile was appropriately labeled so that each solution would be tested for 1, 2, 5 and 10 coats. In order to determine the dry time, the 1 coat tile was coated with 0.5 grams of the appropriate solutions and was visually inspected to determine when the finish was no longer liquid. Time was rounded up to the nearest minute and is shown as Dry Time (Not Wet) in Table 3. After the finish was visually dry, the time it took for the tile to lose its tackiness was determined by touching the tile with bare hands. This was done every five minutes, measured after the tile was first coated, to determine the Dry Time (Not Tacky) as shown in Table 3.

TABLE 3

| | Min | |
|---|---|---|
| Mixture | Dry Time (Not Wet) | Dry Time (Not Tacky) |
| Low Solid Turboset Formula 1 | 5 | 30 |
| Low Solid Turboset Formula 2 | 8 | 20 |
| 1% Permax | 12 | 15 |
| 2% Permax | 16 | 20 |
| 5% Permax | 10 | 30 |
| 1% Sancure | 11 | 15 |
| 2% Sancure | 12 | 20 |
| 5% Sancure | 13 | 25 |

Gloss was determined by coating the 1 coat and 2 coat tiles with 0.5 grams of the 20 gram solutions previously prepared. The 1 coat tile was allowed to dry overnight while the 2 coat tile was let dry for the No Tacky time before applying the second coat. The 5 coat and 10 coat tiles were coated using the 60 gram solutions. Each coat was allowed to dry for 30 minutes before applying the subsequent coat. The 10 coat tiles were coated over two days with 5 coats done per day. The gloss of each tile was measured with the BKY Gardner Spectro-guide 45/0 after each tile was shined using a Wypall X60 cleaning sheet. The baseline measurements for two uncoated tiles are shown in Table 4 and the results for the coated tiles are shown in Tables 5-6.

TABLE 4

| Baseline Measure | 20° Gloss | 60° Gloss |
|---|---|---|
| Baseline 1 (n = 5) | 1.2 ± 0.2 | 9.8 ± 1.0 |
| Baseline 2 (n = 3) | 0.7 ± 0.1 | 6.4 ± 1.0 |

TABLE 5

| | 1 Coat | | 2 Coats | |
|---|---|---|---|---|
| Mixture | 20° | 60° | 20° | 60° |
| Low Solid Turboset Formula 1 | 2.3 ± 0.3 | 15.4 ± 1.3 | 2.9 ± 0.0 | 19.2 ± 0.2 |
| Low Solid Turboset Formula 2 | 3.0 ± 0.4 | 18.8 ± 1.4 | 6.9 ± 0.8 | 33.0 ± 1.5 |
| 1% Permax | 1.0 ± 0.1 | 7.9 ± 1.0 | 1.0 ± 0.1 | 8.6 ± 0.5 |
| 2% Permax | 1.1 ± 0.1 | 8.0 ± 0.3 | 1.0 ± 0.1 | 9.3 ± 0.5 |
| 5% Permax | 1.1 ± 0.1 | 8.9 ± 0.5 | 1.0 ± 0.1 | 8.7 ± 0.6 |
| 1% Sancure | 0.9 ± 0.1 | 7.3 ± 0.3 | 0.8 ± 0.1 | 7.3 ± 0.8 |
| 2% Sancure | 1.2 ± 0.3 | 10.0 ± 2.0 | 1.9 ± 0.5 | 14.8 ± 2.9 |
| 5% Sancure | 2.9 ± 0.9 | 18.5 ± 3.9 | 3.0 ± 0.2 | 20.6 ± 0.9 |

TABLE 6

| | 5 Coats | | 10 Coats | |
|---|---|---|---|---|
| Mixture | 20° | 60° | 20° | 60° |
| Low Solid Turboset Formula 1 | 5.9 ± 0.4 | 29.6 ± 1.2 | 14.4 ± 0.5 | 49.2 ± 1.7 |
| Low Solid Turboset Formula 2 | 16.3 ± 1.1 | 50.7 ± 0.6 | 35.4 ± 1.7 | 71.2 ± 1.1 |
| 1% Permax | 0.7 ± 0.1 | 7.8 ± 0.9 | 0.9 ± 0.3 | 8.7 ± 2.2 |
| 2% Permax | 0.8 ± 0.3 | 8.7 ± 1.9 | 1.0 ± 0.3 | 9.5 ± 2.4 |
| 5% Permax | 2.3 ± 0.4 | 16.8 ± 2.1 | 2.3 ± 0.5 | 16.5 ± 2.0 |
| 1% Sancure | 1.0 ± 0.2 | 9.7 ± 1.8 | 1.3 ± 0.0 | 13.1 ± 0.5 |
| 2% Sancure | 3.2 ± 0.7 | 22.7 ± 2.3 | 2.6 ± 0.1 | 21.0 ± 0.8 |
| 5% Sancure | 4.1 ± 0.2 | 24.2 ± 0.7 | 6.3 ± 1.8 | 35.4 ± 6.4 |

The results demonstrated that Permax 232 is not a preferred polymer for the low solids floor coatings. While not wishing to be bound by the theory, it is believe that it cannot adhere to the tile because of it is non-self crosslinking, whereas the Turboset 2027 and Sancure 970. None of the solutions containing Permax adhered to the tile and the film was easily removed. Sancure adhered to the tile and gave a modest gloss increase while Turboset gave a good gloss increase with 10 coats of 5 Turboset Formula 2 having more gloss than 5 coats of the Maxx Durable mixture. Overall lower solids content resulted in faster dry time, with 5% solids solutions showing the longest dry time. Furthermore the addition of solvent was found to decrease the dry time, at least for not wet time. This was limited to a certain point, at which additional solvent did not speed up the dry time. The 5 wt-% solvent in the Turboset Formula 1 was found to be too much. Furthermore, the Turboset Formula 2 appeared hazy in the wet film, which could be an indication that there was too much solvent. Further it was found that without solvent Sancure 970 provided uneven leveling.

Example 2

Sancure 970 and Turboset 2027 Low Solid Floor Finish Gloss Test

The purpose of this example was to determine and compare the gloss seen by coating low solid floor finishes of Sancure 970 and Turboset 2027 on a coat by coat basis in order to determine how low solid floor finishes gloss changes at each coat. Additionally this example served to provide a comparison of Sancure 970 and Turboset 2027 finishes.

The Low Solid Turboset Formula 2 composition from Table 2 was used to mix a 5% solid content floor coating composition including Turboset. A 5% solid content floor coating composition was also prepared with Sancure as shown in Table 7 and is referred to as the Low Solid Sancure Formula 1.

TABLE 7

| Component | Wt-% |
|---|---|
| Water | 86.99 |
| Sancure 970 | 11.90 |
| Butyl Carbitol | 1.00 |
| BYK 347 | 0.11 |

In order to determine the dry time of the Sancure composition, one tile was coated with 0.5 grams of finish was visually inspected to determine when the finish was no longer liquid. The time was rounded to the nearest minute and labeled as the Dry Time Not Wet. After the finish was visually dry, the time for the tile to lose its tackiness by touching the tile with bare hands was determined. This was done every five minutes, measured after the tile was first coated, to determine the Dry Time Not Tacky. It was determined that Sancure 970 had a Dry Time Not Wet of 14 minutes and a Dry Time Not Tacky of 15 minutes.

Figure 2:
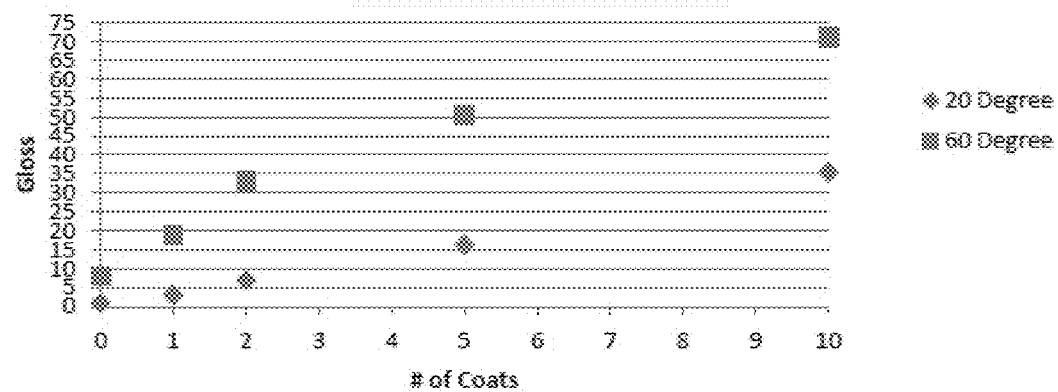
FIG. 2 shows the gloss measurements for Turboset 2 after the application of numerous coatings.
Figure 3:
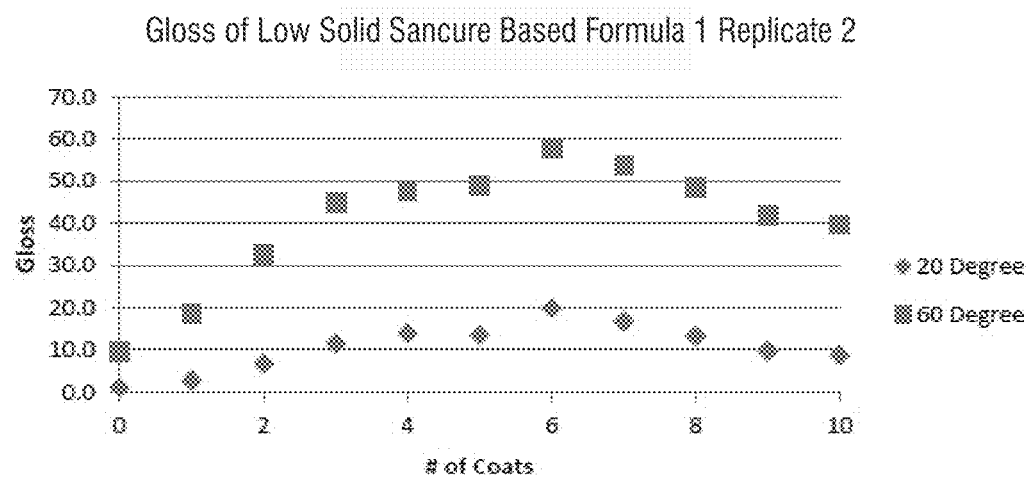
FIG. 3 shows the gloss measurements for Sancure 2 after the application of numerous coatings.

Tiles were prepared as in Example 1 and gloss measurements were taken as in Example 1. Results are shown in Tables 8-11. The data from Tables 8, 9, and 11 are graphically represented in FIGS. 1-3, respectively.

TABLE 8

| Floor Finish | 20° | 60° |
|---|---|---|
| Baseline | 1.1 ± 0.1 | 9.1 ± 1.0 |
| Low Solid Turboset Formula 2 Replicate 1 Coat 1 | 3.5 ± 0.5 | 20.5 ± 1.8 |
| Low Solid Turboset Formula 2 Replicate 1 Coat 2 | 7.3 ± 0.8 | 33.6 ± 2.2 |
| Low Solid Turboset Formula 2 Replicate 1 Coat 3 | 11.3 ± 1.7 | 43.2 ± 3.1 |
| Low Solid Turboset Formula 2 Replicate 1 Coat 4 | 15.8 ± 0.2 | 50.3 ± 0.3 |
| Low Solid Turboset Formula 2 Replicate 1 Coat 5 | 20.7 ± 1.0 | 57.3 ± 1.7 |
| Low Solid Turboset Formula 2 Replicate 1 Coat 6 | 25.6 ± 1.9 | 62.0 ± 1.6 |
| Low Solid Turboset Formula 2 Replicate 1 Coat 7 | 29.6 ± 1.3 | 66.2 ± 1.1 |
| Low Solid Turboset Formula 2 Replicate 1 Coat 8 | 32.2 ± 3.0 | 70.1 ± 1.5 |
| Low Solid Turboset Formula 2 Replicate 1 Coat 9 | 32.4 ± 2.8 | 69.5 ± 2.4 |
| Low Solid Turboset Formula 2 Replicate 1 Coat 10 | 32.8 ± 2.3 | 70.5 ± 2.1 |
| Next Day | 31.7 ± 1.4 | 70.4 ± 1.1 |

TABLE 9

| Floor Finish | 20° | 60° |
|---|---|---|
| Baseline | 1.4 ± 0.2 | 10.4 ± 1.1 |
| Low Solid Turboset Formula 2 Replicate 2 Coat 1 | 2.9 ± 0.6 | 17.4 ± 2.5 |
| Low Solid Turboset Formula 2 Replicate 2 Coat 2 | 6.6 ± 1.1 | 30.6 ± 2.7 |
| Low Solid Turboset Formula 2 Replicate 2 Coat 3 | 10.6 ± 2.0 | 41.2 ± 3.2 |
| Low Solid Turboset Formula 2 Replicate 2 Coat 4 | 14.5 ± 0.4 | 48.0 ± 0.6 |
| Low Solid Turboset Formula 2 Replicate 2 Coat 5 | 18.8 ± 1.8 | 53.8 ± 2.1 |
| Low Solid Turboset Formula 2 Replicate 2 Coat 6 | 23.1 ± 1.4 | 59.3 ± 1.2 |
| Low Solid Turboset Formula 2 Replicate 2 Coat 7 | 17.8 ± 1.4 | 54.5 ± 1.4 |
| Low Solid Turboset Formula 2 Replicate 2 Coat 8 | 11.3 ± 0.7 | 36.8 ± 0.6 |
| Low Solid Turboset Formula 2 Replicate 2 Coat 9 | 6.0 ± 1.0 | 27.5 ± 2.2 |
| Low Solid Turboset Formula 2 Replicate 2 Coat 10 | 6.9 ± 0.5 | 30.8 ± 2.5 |
| Next Day | 6.4 ± 0.4 | 30.6 ± 3.3 |

TABLE 10

| Floor Finish | 20° | 60° |
|---|---|---|
| Baseline | 1.1 ± 0.1 | 9.4 ± 0.3 |
| Low Solid Sancure Formula 1 Replicate 1 Coat 1 | 2.8 ± 0.1 | 18.5 ± 0.1 |
| Low Solid Sancure Formula 1 Replicate 1 Coat 2 | 4.9 ± 1.1 | 26.2 ± 3.1 |
| Low Solid Sancure Formula 1 Replicate 1 Coat 3 | 12.4 ± 3.0 | 45.6 ± 4.7 |
| Low Solid Sancure Formula 1 Replicate 1 Coat 4 | 13.2 ± 1.1 | 47.9 ± 1.2 |
| Low Solid Sancure Formula 1 Replicate 1 Coat 5 | 15.5 ± 2.7 | 51.6 ± 4.4 |
| Low Solid Sancure Formula 1 Replicate 1 Coat 6 | 15.2 ± 1.4 | 51.1 ± 1.8 |
| Low Solid Sancure Formula 1 Replicate 1 Coat 7 | 16.0 ± 1.0 | 52.3 ± 1.2 |
| Low Solid Sancure Formula 1 Replicate 1 Coat 8 | 11.6 ± 1.8 | 45.6 ± 2.6 |
| Low Solid Sancure Formula 1 Replicate 1 Coat 9 | 6.8 ± 2.7 | 32.0 ± 8.1 |
| Low Solid Sancure Formula 1 Replicate 1 Coat 10 | 6.3 ± 1.5 | 30.6 ± 4.5 |
| Next Day | 5.7 ± 1.8 | 31.8 ± 5.4 |

TABLE 11

| Floor Finish | 20° | 60° |
|---|---|---|
| Baseline | 1.1 ± 0.1 | 9.4 ± 0.1 |
| Low Solid Sancure Formula 1 Replicate 2 Coat 1 | 2.7 ± 0.2 | 18.4 ± 0.8 |
| Low Solid Sancure Formula 1 Replicate 2 Coat 2 | 6.7 ± 1.0 | 32.4 ± 3.2 |
| Low Solid Sancure Formula 1 Replicate 2 Coat 3 | 11.5 ± 1.0 | 44.7 ± 1.2 |
| Low Solid Sancure Formula 1 Replicate 2 Coat 4 | 13.9 ± 1.9 | 47.6 ± 2.2 |
| Low Solid Sancure Formula 1 Replicate 2 Coat 5 | 13.4 ± 0.7 | 48.9 ± 0.7 |
| Low Solid Sancure Formula 1 Replicate 2 Coat 6 | 19.8 ± 2.0 | 57.8 ± 1.8 |
| Low Solid Sancure Formula 1 Replicate 2 Coat 7 | 16.7 ± 3.7 | 53.7 ± 4.7 |
| Low Solid Sancure Formula 1 Replicate 2 Coat 8 | 13.2 ± 1.6 | 48.5 ± 0.6 |
| Low Solid Sancure Formula 1 Replicate 2 Coat 9 | 9.7 ± 1.5 | 41.9 ± 4.5 |
| Low Solid Sancure Formula 1 Replicate 2 Coat 10 | 8.7 ± 1.2 | 39.6 ± 3.0 |
| Next Day | 6.4 ± 0.8 | 34.5 ± 0.1 |

The Low Solid Sancure Formula 1 Replicate 2 coating never showed complete leveling, and the final film showed micro cracks in the surface, pooling and uneven dry. This occurred for all coats and worsened with additional coatings, which was particularly noticeable in coatings 7-10 and on the next day. It is likely that this contributed to the loss of gloss seen in the later coats. Both replicates of Low Solid Turboset Formula 2 performed the same until Coat 7 where replicate 2 started decreasing in gloss. At the seventh coat the Low Solid Turboset Formula 2 Replicate 2 film showed micro cracks and uneven surface appearance. After more coats of Turboset were applied drop lines appeared and recoat attack was seen inside the finish but not on the surface.

The Low Solid Turboset Formula 2 Replicate 1 data showed a plateau affect for coats 8-10 which all had equivalent gloss. Typically a plateau does occur except at extremely high glosses around 70, not 32. Without being bound by the theory, it is believed that the lower solids may have lowered this plateau threshold or that it was a product of 10 coats being applied in a single day.

Example 3

Plateau Effect Comparison of Low Solid and Traditional Turboset Solutions

Example 3 was performed to determine at what coat and what gloss value a low solid formula with 5% solids and a traditional formula with 27% solids content the Turboset floor finishes stopped increasing gloss and when a plateau effect began.

The Low Solid Turboset Formula 2 from Example 1 was used. The traditional floor finish formula is provided in Table 12:

TABLE 12

| Component | Traditional Turboset Formula |
| --- | --- |
| Water | 27.39 |
| Turboset 2027 | 67.50 |
| Butyl Carbitol | 5.0 |
| BYK 347 | 0.11 |

Figure 4:
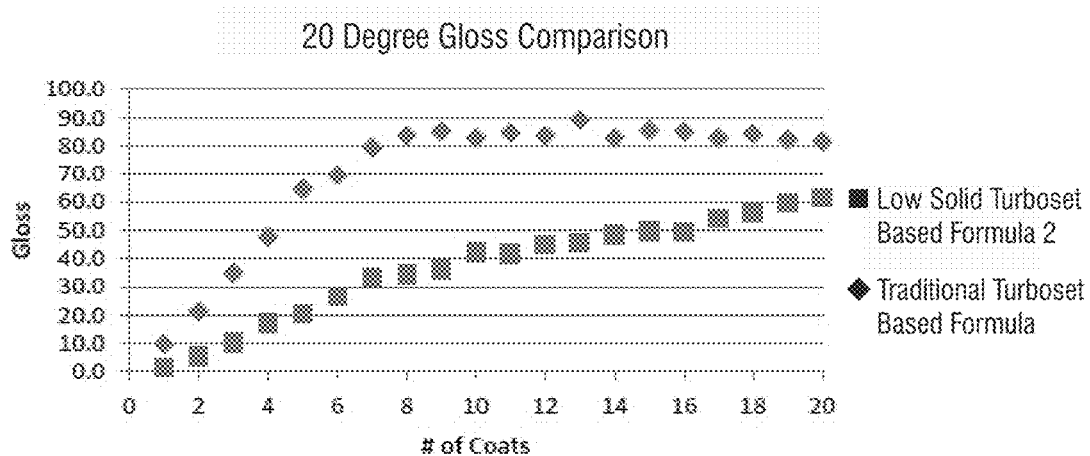
FIG. 4 shows a comparison of the twenty degree gloss measurements for a 5% solids Turboset formulation and a 27% solids Turboset formulation after the application of numerous coatings.
Figure 5:
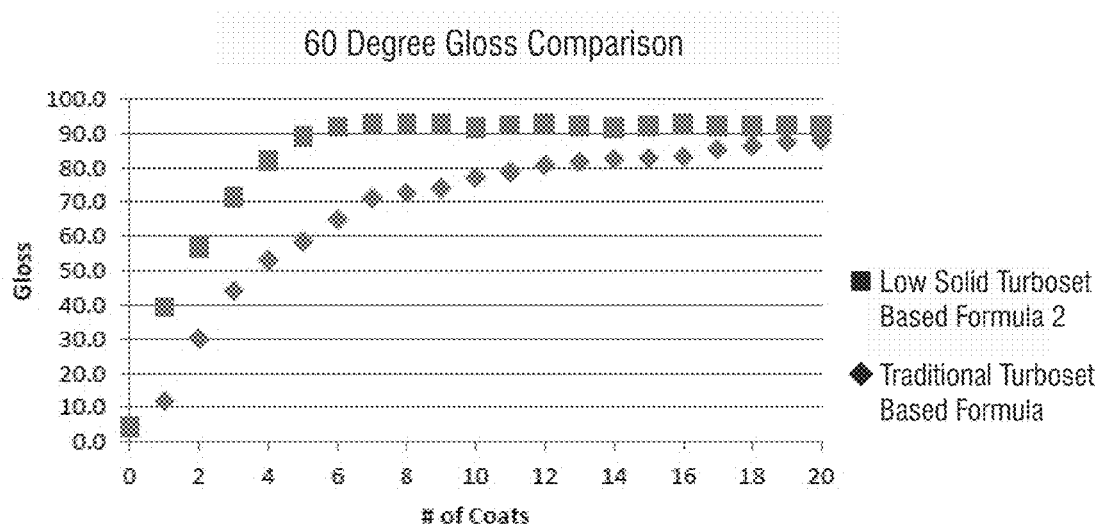
FIG. 5 shows a comparison of the sixty degree gloss measurements for a 5% solids Turboset formulation and a 27% solids Turboset formulation after the application of numerous coatings.

Black VCT tiles were scrubbed, allowed to dry, and appropriately labeled. Each half of the tile had 1.0 gram of the appropriate solution coated and spread evenly on its surface. The coating was allowed to dry for at least 30 minutes before gloss was measured using the same procedure as Example 1 with a baseline of n=5. Five coats were applied each day for four days. The gloss was measured after each coat dried and then after the tile was allowed to dry overnight. The results are shown in Tables 13-14 and FIGS. 4-5. Comparison values are provided in Table 15.

TABLE 13

| Traditional Turboset Formula Data | 20° | 60° |
| --- | --- | --- |
| Traditional Turboset Formula Coat 1 | 9.7 ± 0.5 | 39.5 ± 0.8 |
| Traditional Turboset Formula Coat 2 | 21.3 ± 2.0 | 56.9 ± 1.7 |
| Traditional Turboset Formula Coat 3 | 34.8 ± 1.7 | 71.5 ± 1.4 |
| Traditional Turboset Formula Coat 4 | 47.6 ± 4.4 | 82.2 ± 1.7 |
| Traditional Turboset Formula Coat 5 | 64.5 ± 3.2 | 89.0 ± 1.1 |
| Next Day 1 | 50.5 ± 4.0 | 85.4 ± 2.1 |
| Traditional Turboset Formula Coat 6 | 69.4 ± 3.2 | 91.9 ± 0.4 |
| Traditional Turboset Formula Coat 7 | 79.4 ± 2.5 | 92.6 ± 0.2 |
| Traditional Turboset Formula Coat 8 | 83.7 ± 0.9 | 92.5 ± 0.4 |
| Traditional Turboset Formula Coat 9 | 85.1 ± 1.9 | 92.7 ± 0.3 |
| Traditional Turboset Formula Coat 10 | 82.8 ± 4.7 | 91.8 ± 1.1 |
| Next Day 2 | 85.1 ± 1.7 | 91.9 ± 0.2 |
| Traditional Turboset Formula Coat 11 | 84.6 ± 1.0 | 92.4 ± 0.5 |
| Traditional Turboset Formula Coat 12 | 83.7 ± 2.0 | 92.5 ± 0.4 |
| Traditional Turboset Formula Coat 13 | 89.2 ± 2.5 | 92.1 ± 0.4 |
| Traditional Turboset Formula Coat 14 | 82.8 ± 3.1 | 91.8 ± 0.2 |
| Traditional Turboset Formula Coat 15 | 85.5 ± 1.0 | 92.2 ± 0.3 |
| Next Day 3 | 84.4 ± 2.0 | 93.4 ± 0.4 |
| Traditional Turboset Formula Coat 16 | 85.0 ± 0.9 | 92.7 ± 0.5 |
| Traditional Turboset Formula Coat 17 | 82.7 ± 1.8 | 92.3 ± 0.7 |
| Traditional Turboset Formula Coat 18 | 84.2 ± 3.0 | 92.1 ± 0.4 |
| Traditional Turboset Formula Coat 19 | 82.1 ± 1.6 | 92.4 ± 0.3 |
| Traditional Turboset Formula Coat 20 | 81.6 ± 3.0 | 92.0 ± 0.5 |
| Next Day 4 | 83.1 ± 2.8 | 92.4 ± 0.7 |

TABLE 14

| Low Solid Turboset Formula 2 Data | 20° | 60° |
| --- | --- | --- |
| Low Solid Turboset Formula 2 Coat 1 | 1.5 ± 0.5 | 11.9 ± 2.5 |
| Low Solid Turboset Formula 2 Coat 2 | 5.3 ± 1.1 | 30.1 ± 4.4 |
| Low Solid Turboset Formula 2 Coat 3 | 10.4 ± 1.3 | 44.2 ± 3.0 |
| Low Solid Turboset Formula 2 Coat 4 | 17.1 ± 2.6 | 53.2 ± 3.3 |
| Low Solid Turboset Formula 2 Coat 5 | 20.5 ± 0.8 | 58.5 ± 1.4 |
| Next Day 1 | 18.7 ± 0.5 | 56.6 ± 1.6 |
| Low Solid Turboset Formula 2 Coat 6 | 26.6 ± 2.2 | 64.9 ± 1.9 |
| Low Solid Turboset Formula 2 Coat 7 | 33.3 ± 1.8 | 71.2 ± 1.9 |
| Low Solid Turboset Formula 2 Coat 8 | 34.4 ± 2.3 | 72.7 ± 1.5 |
| Low Solid Turboset Formula 2 Coat 9 | 36.0 ± 2.3 | 74.0 ± 1.6 |
| Low Solid Turboset Formula 2 Coat 10 | 42.2 ± 4.2 | 77.1 ± 3.1 |
| Next Day 2 | 40.0 ± 0.4 | 76.5 ± 1.0 |
| Low Solid Turboset Formula 2 Coat 11 | 41.5 ± 2.9 | 78.7 ± 2.0 |
| Low Solid Turboset Formula 2 Coat 12 | 45.0 ± 1.6 | 80.7 ± 1.2 |
| Low Solid Turboset Formula 2 Coat 13 | 45.6 ± 1.5 | 81.6 ± 1.5 |
| Low Solid Turboset Formula 2 Coat 14 | 48.3 ± 2.6 | 82.5 ± 0.8 |
| Low Solid Turboset Formula 2 Coat 15 | 49.4 ± 2.8 | 82.8 ± 2.0 |
| Next Day 3 | 47.5 ± 2.4 | 82.4 ± 1.3 |
| Low Solid Turboset Formula 2 Coat 16 | 49.3 ± 2.2 | 83.2 ± 1.1 |
| Low Solid Turboset Formula 2 Coat 17 | 54.1 ± 3.1 | 85.4 ± 1.3 |
| Low Solid Turboset Formula 2 Coat 18 | 56.3 ± 2.1 | 86.4 ± 0.8 |
| Low Solid Turboset Formula 2 Coat 19 | 59.8 ± 3.1 | 87.6 ± 1.5 |
| Low Solid Turboset Formula 2 Coat 20 | 61.6 ± 2.3 | 88.0 ± 0.8 |
| Next Day 4 | 58.6 ± 1.6 | 87.6 ± 0.4 |

TABLE 15

| # of Coats of Traditional Turboset | 20° Gloss (value) | 60° Gloss (Value) | # of Coats of Low Solids Formula 2 | Solids on Tile for Low Solids Formula 2 | Difference of Solids |
| --- | --- | --- | --- | --- | --- |
| 1 | 7-13 | 37-43 | 2-3 | 5-10 | 17-22 |
| 2 | 18-24 | 54-60 | 4-6 | 20-30 | 24-34 |
| 3 | 32-38 | 69-75 | 7-9 | 35-45 | 36-46 |
| 4 | 45-51 | 79-85 | 12-17 | 60-85 | 23-48 |
| 5 | 62-68 | 86-92 | 20+ | 100+ | <35 |
| Next Day 1 | 47-53 | 82-88 | 14-17 | 70-85 | 50-65 |

Only traditional Turboset was coated until it reached its plateau point which was 8 coats for 20 degree gloss and 6 coats for 60 degree gloss which reached gloss of 82 and 92 respectively. After 20 coats, Low Solids Formula 2 Turboset did not reach its plateau point for either gloss angle. The 20 degree gloss angle was still far off with many more coats needed; however enough coats were done to determine the equivalence between the two formulas. These ranges should apply after the finish dries as well as when it is wet because the gloss decrease seen after drying is only 2 points for the Low Solids Formula 2 Turboset instead of the 10-15 point decrease seen for Traditional Turboset. The 2 point gloss decrease was seen for each overnight dry time regardless of the gloss value. The 60 degree gloss increases much less evenly and its gloss increase tapers off much faster for the Low Solids Formula 2 Turboset. Overall the Low Solids Formula 2 Turboset reached the equivalent gloss of traditional with less solids on the tile (defined by the percent solids multiplied by the number of coats applied), which means that less raw materials was used for the same level of gloss. Because less raw materials are added, the tile is easier to strip. To reach the equivalent gloss of the traditional Turboset there was generally around one coat less of finish on the tile for the Low Solids Formula 2 Turboset. The equivalent gloss of 5 coats can be reached with around 4 coats of solids on it if the tile was coated with Low Solids Formula 2 Turboset instead of traditional Turboset.

Example 4

Ten Coat Comparison of Low Solid Turboset Formula and Reformatted Low Solid Sancured Floor Finishes Example 4 evaluated the differences between a 5% Turboset and a 5% reformulation of Sancure 970 in gloss and finish appearance when ten coats of each are applied in a day. Batches of Turboset 2027 and Sancure 970 were created in 100 gram amounts. The formulation for Turboset 2027 was the same as Example 3 and the Sancure 970 reformulation was prepared according to Table 16. Both finishes were stirred for one hour before bottling.

TABLE 16

| Component | Low Solid Sancured Formula 2 |
|---|---|
| Water | 86.36 |
| Sancure 970 | 11.9 |
| Butyl Carbitol | 1.5 |
| BYK 347 | 0.12 |
| Tego Glide 410 | 0.12 |

Figure 6:
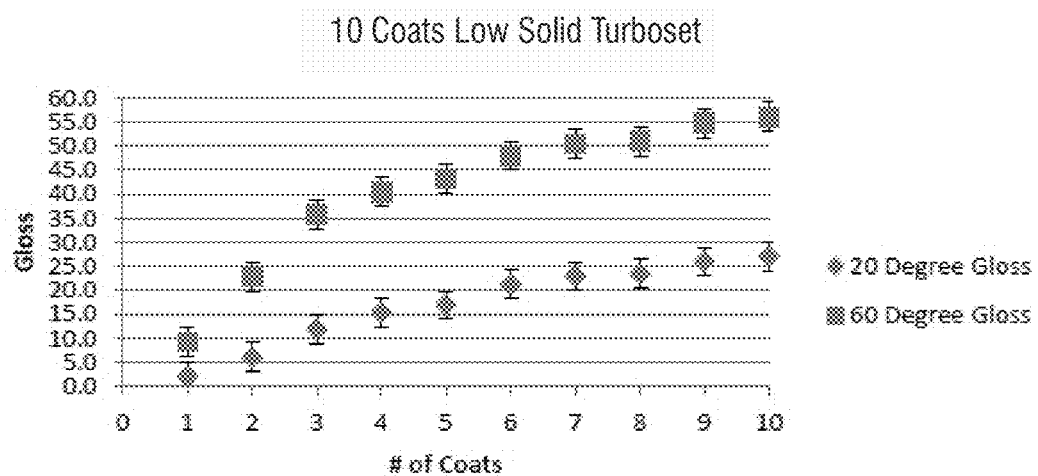
FIG. 6 shows the gloss measurements for a 5% solids Turboset formulation after the application of numerous coatings.
Figure 7:
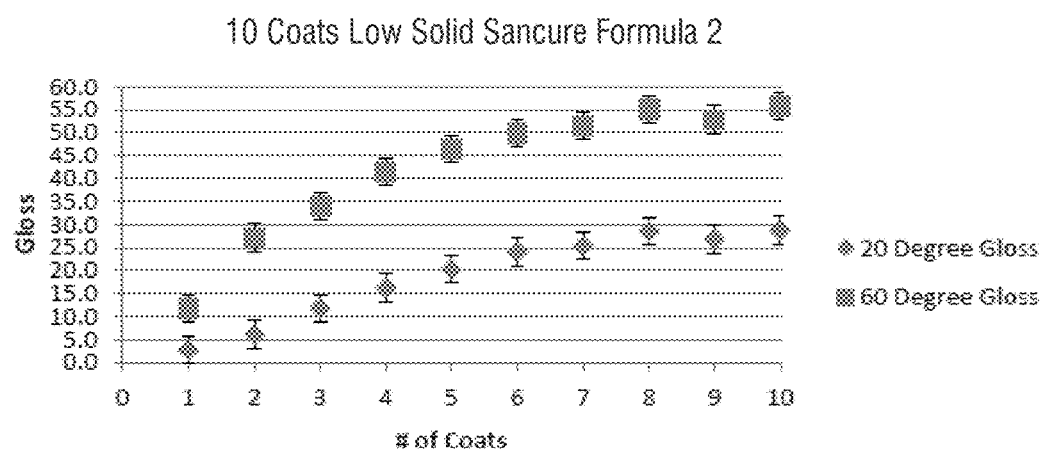
FIG. 7 shows the gloss measurements for Sancure reformulation, including an additional siloxane surfactant, after the application of numerous coatings.

A black VCT tile was scrubbed and allowed to dry before it was divided in half and labeled for each solution. Each half had 1.0 gram of the appropriate solution coated and spread evenly on its surface. The coating was allowed to dry for 30 minutes between coats and was allowed to dry for over an hour before the gloss was measured as in Example 3. The gloss was measured after each of the ten coats as well as the following day. The results are shown in Table 17 and FIGS. 6-7

TABLE 17

| # of Coats (Turboset) | 20° Gloss | 60° Gloss | # of Coats (Sancure) | 20° Gloss | 60° Gloss |
|---|---|---|---|---|---|
| 1 | 2.0 ± 0.9 | 9.1 ± 1.7 | 1 | 2.7 ± 1.0 | 11.7 ± 3.5 |
| 2 | 6.0 ± 1.4 | 22.9 ± 2.8 | 2 | 6.1 ± 2.2 | 27.1 ± 6.9 |
| 3 | 11.8 ± 1.6 | 35.8 ± 2.1 | 3 | 11.8 ± 2.7 | 34.0 ± 3.6 |
| 4 | 15.3 ± 1.0 | 40.5 ± 1.3 | 4 | 16.2 ± 3.1 | 41.3 ± 3.9 |
| 5 | 16.9 ± 2.6 | 43.2 ± 4.4 | 5 | 20.2 ± 4.3 | 46.5 ± 4.3 |
| 6 | 21.2 ± 1.0 | 48.0 ± 1.7 | 6 | 24.0 ± 3.6 | 49.9 ± 3.9 |
| 7 | 23.0 ± 1.3 | 50.4 ± 1.5 | 7 | 25.3 ± 4.3 | 51.5 ± 2.5 |
| 8 | 23.4 ± 2.8 | 50.9 ± 3.9 | 8 | 28.5 ± 3.4 | 55.1 ± 2.4 |
| 9 | 26.0 ± 1.9 | 54.7 ± 1.3 | 9 | 26.8 ± 2.4 | 52.9 ± 1.7 |
| 10 | 27.1 ± 1.1 | 56.0 ± 1.7 | 10 | 28.7 ± 1.8 | 55.7 ± 1.5 |
| Next Day | 24.4 ± 1.2 | 53.5 ± 0.9 | Next Day | 22.3 ± 1.7 | 50.1 ± 1.7 |

Overall both the Low Solid Turboset Formula 2 and Low Solids Sancure Formula 2 showed the same gloss and mediocre leveling in this experiment. Both finishes had some pooling and the edges showed signs of the finish retreating during the drying process. The leveling on the Sancure 970 was better than the previous examples but still was not as favorable as that seen for the earlier Turboset 2027 mixtures.

Example 5

Alcohol Screening Test of 5 Coats of 5% Turboset 2027 and Sancure 970

Example 5 evaluated the resistance to alcohol damage for the 5% solutions of Turboset 2027 and Sancure 970. Endure 320 (Ecolab, Inc.), an alcohol based hand sanitizer including a quaternary ammonium compound that is known to damage floor finishes, was used for the testing.

Figure 8:
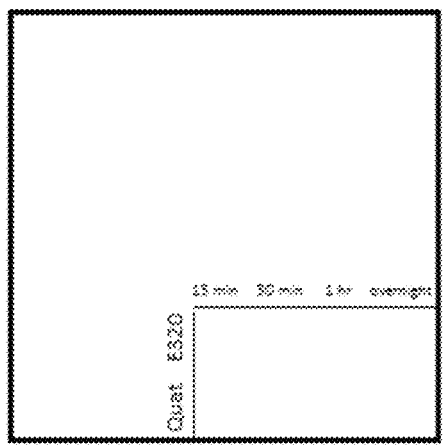
FIG. 8 shows the pattern of labeling and testing for the tiles in Example 5.
Figure 9:
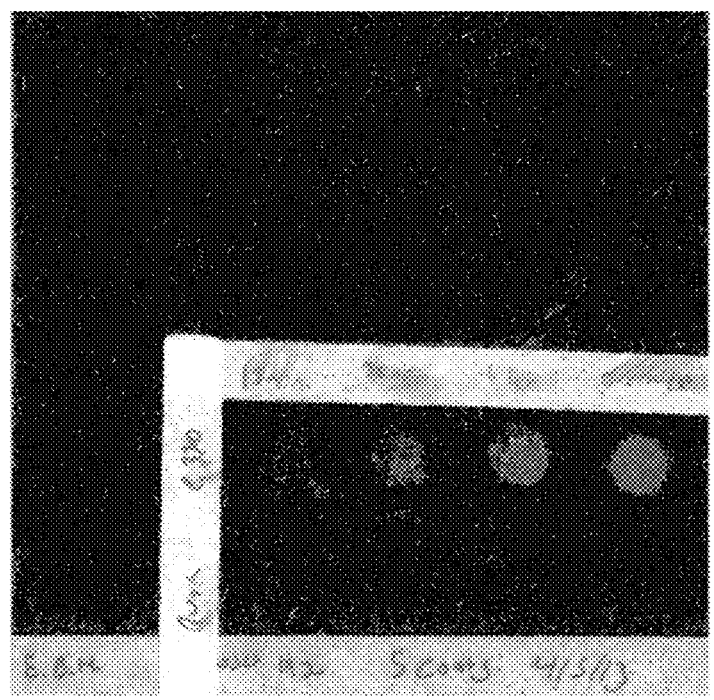
FIG. 9 shows a scanned and enhanced tile from Example 5 as labeled according to FIG. 8 and coated with Turboset.
Figure 10:
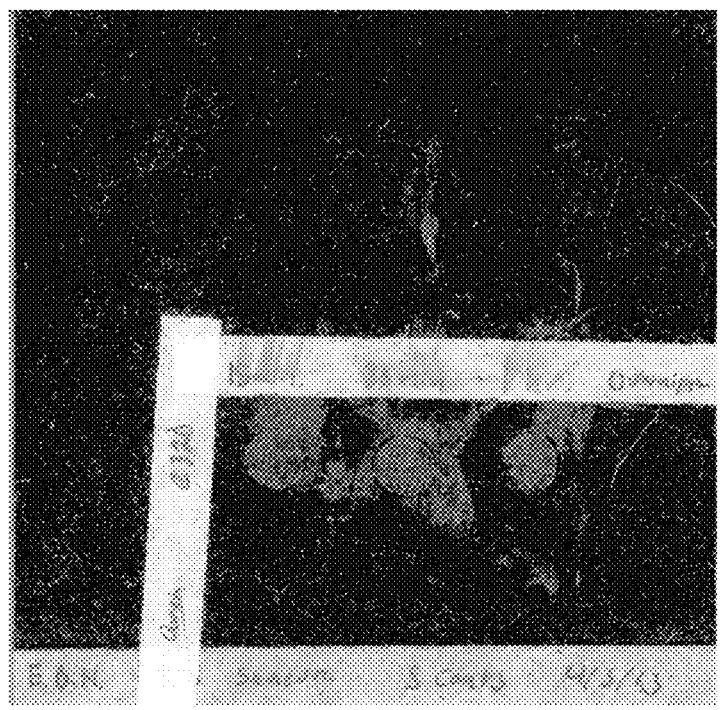
FIG. 10 shows a scanned and enhanced tile from Example 5 as labeled according to FIG. 8 and coated with Sancure.

Tiles with 5 coats of Low Solid Turboset Formula 2 and Low Solids Sancure Formula 2 were allowed to cure overnight at room temperature and then cured for one week in a 50° C. oven. After a week, the tiles were removed and labeled in the pattern shown in FIG. 8. Foam rings were attached to the tiles such that the hand sanitizer had a dwell time of 15 minutes, 30 minutes, 1 hour, and overnight. Each ring was then filled and allowed to dwell for the given time. At the end of the time, the cleaner was removed and blotted dry with a Wypall X60 cleaning sheet until dry. The spots were then visually inspected to determine if the finish's appearance had been impacted by the cleaner. The tiles were then scanned and were enhanced in order see any differences. These slides are shown in FIGS. 9 and 10.

Both of the finishes in this experiment showed alcohol damage. The Sancure 970 floor coating showed more damage than the Turboset. The smudges seen around the foam ring mark indicated that the finish was damaged from brief contact with alcohol because the damage occurred from the removal of the Endure 320 from the foam ring. While not wishing to be bound by the theory, it is believed that this distinction is due to Sancure 970-being non-self-crosslinking, needs a second, crosslinking component. The damage seen with the 5% Turboset was less severe but still significant.

Example 6

Spray-Able Coating Proof of Concept

Example 6 evaluated the efficacy of applying the 5% Turboset 2027 floor coating with various sprayers.
Preval Sprayer System First a professional grade pressurized aerosol spray can attachment (Preval Sprayer) was attached to a bottle a 5% solid Turboset floor coating composition. The Preval sprayer is unable to spray horizontally. Thus, the tile was laid vertically on the table and the sprayer was used to try to coat it; however, the bottle began to leak due to the fact the Preval sprayer cannot be used horizontally. The tile was then flipped vertically and the Preval was used to coat the tile. The sprayer began starting and stopping and resulting in the coating streaking down the tile. The mass of solution on the tile was then measured to be around 4 grams and the coat was left to dry horizontally in a 68° F. room at 30% humidity. It was determined that it took 35 minutes for the tile to dry with pooling and visible streak lines seen as it dried. The gloss of the tile did increase despite the unfavorable final finish appearance.

The test was repeated by spraying a fine layer of coating on a vertical tile. The tile was left to dry in the vertical direction and it dried with a favorable finish appearance. This was done three times; each time there was good leveling and finish appearance as long as the excess floor coating composition was allowed to drip off the tile.
Hand Held Small Spray Bottle with Atomizing Nozzle A small handheld bottle was used to spray the tiles horizontally with Low Solids Turboset Formula 1. The finished tile had 10 grams on the surface and entire tile had a standing finish on it. However, it was determined that the mist was not fine enough and therefore too much finish was added to the tile.

Ecolab, Inc. Pump-Up Foamer/Sprayer

An Ecolab Pump-up Foamer/Sprayer was also tested. The sprayer could operate horizontally. A 500 gram batch of Low Solids Turboset Formula 2 was prepared and added to the sprayer. The sprayer was used to coat a single tile horizontally. There were two different kinds of coats that were done with this set-up: one that had 10+ grams of solution on the tile which occurred from multiple sweeps of the sprayer and those containing around 3 grams of finish which came from a single sweep. The 10+ coating had pooling at the edges of the tile because the tile was convex, and had very long dry times. The coatings gave the same gloss increase that a normal coat would provide. The coatings also provided good leveling and the tile was tack free as soon as it was visually dry. The 3 gram coat covered 95% of the tile with finish, but beaded at the edges so the finish did not flow into a continuous sheet. Thus it had an uneven dry finish appearance, while providing a similar gloss increase and a faster dry time.

Example 7

Serial Strip Test of 10 Coats of Low Solid Turboset

Example 7 evaluated how Low Solid Turboset Formula 2 strips compared to Maxx Durable of similar gloss values. Ten coats of Low Solid Turboset Formula 2 and 5 coats of Maxx Durable were applied. New samples of 1:2, 1:4, 1:8, 1:16, 1:32, 1:64 dilutions of Maxx Floor Finish Remover were created from using Maxx Floor Finish Remover from a source that and 0-grain water.

Figure 11:
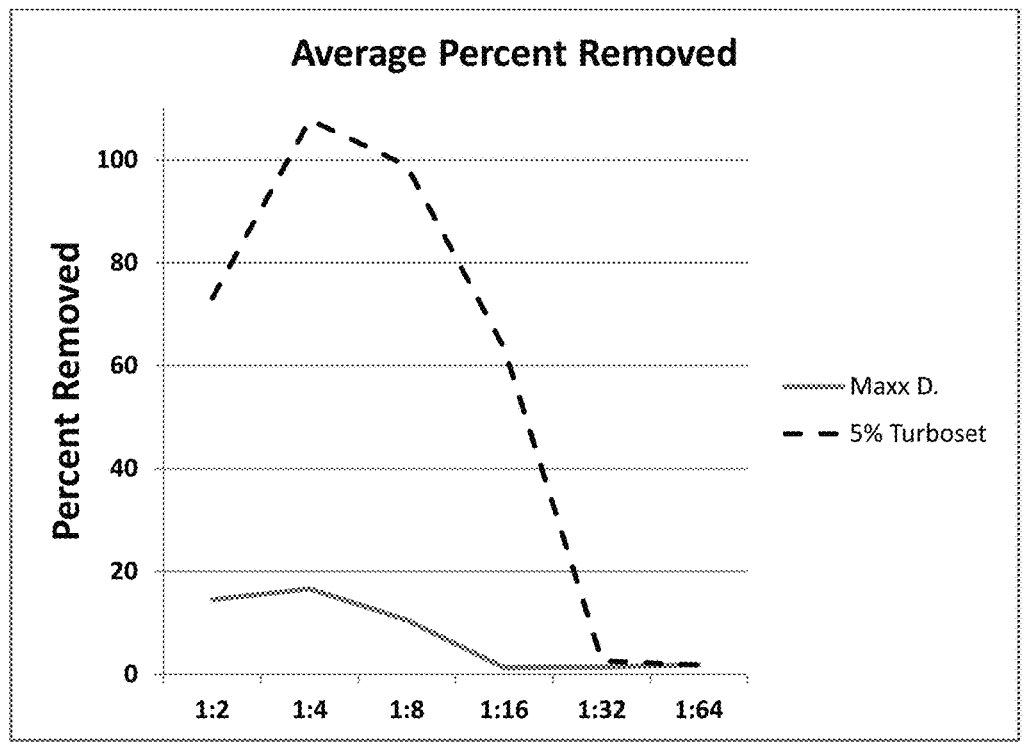
FIG. 11 shows the average percentage of floor finish removed from the floor after comparing an exemplary embodiment of the low solids surface coating compositions with a commercially available floor coating composition.

Tiles were coated with 10 coats of Low Solid5 Turboset Formula 2 composition from Example 4. The tiles were allowed to cure overnight at room temperature and then cured for a week in a 50° C. oven. In a fume hood, each set had 12 foam rings attached which were then filled such that each dilution of remover. The remover was allowed to sit for 30 minutes before it was removed and the tile was blotted dry with a Wypall X60 cleaning sheet. The tile was allowed to air dry completely before it was polished using a fresh Wypall sheet. These tiles were then scanned and analyzed using Fiji Image Analysis software to determine how much floor finish was removed. The average percentage removed is shown in Table 18 and FIG. 11.

TABLE 18

| Average % Removed | 1:2 | 1:4 | 1:8 | 1:16 | 1:32 | 1:64 |
|---|---|---|---|---|---|---|
| Maxx Durable | 14.5 | 16.6 | 10.5 | 1.3 | 1.4 | 1.9 |
| Low Solid Turboset Formula 2 | 73.1 | 107.8 | 98.9 | 63.3 | 2.6 | 1.8 |

Overall 10 coats of Low Solid Turboset Formula 2 was much easier to remove than 5 coats of Maxx Durable. The Low Solid Turboset Formula 2 had complete removal for both 1:4 and 1:8 dilutions of Maxx Floor Finish Remover. Maxx Durable had much lower than normal amount of finish removed for this experiment just like the previous time this tile was stripped. The 10 coats of Low Solid Turboset Formula 2 has more removed than any 5 coats Maxx Durable tile.

Example 8

Baseline Gloss of 5% Turboset with Omna-Glo 100

Example 8 evaluated if the addition of Omna-Glo (OGLO-100) would change the gloss of a 5% Turboset formula. A floor coating composition of Low Solids Turboset Formula 2 was prepared as in Example 3 and used as a control. A 20 gram pour of Maxx Durable Part A was also made before a 1.13 g of Part B was added and the entire mixture was shaken for use as an additional control. Two new 100 gram solutions containing Turboset and OGLO were created using the compositions found in Table 19.

TABLE 19

| Ingredients | Low Solid Turboset + OGLO Formula 1 | Low Solid Turboset + OGLO Formula 2 |
|---|---|---|
| Water | 85.11 g | 83.83 g |
| Turboset 2027 | 12.50 g | 12.50 g |
| Omna-Glo 100 | 1.28 g | 2.56 g |
| Butyl Carbitol | 1.00 g | 1.00 g |
| BYK 347 | 0.11 g | 0.11 g |

Figure 12:
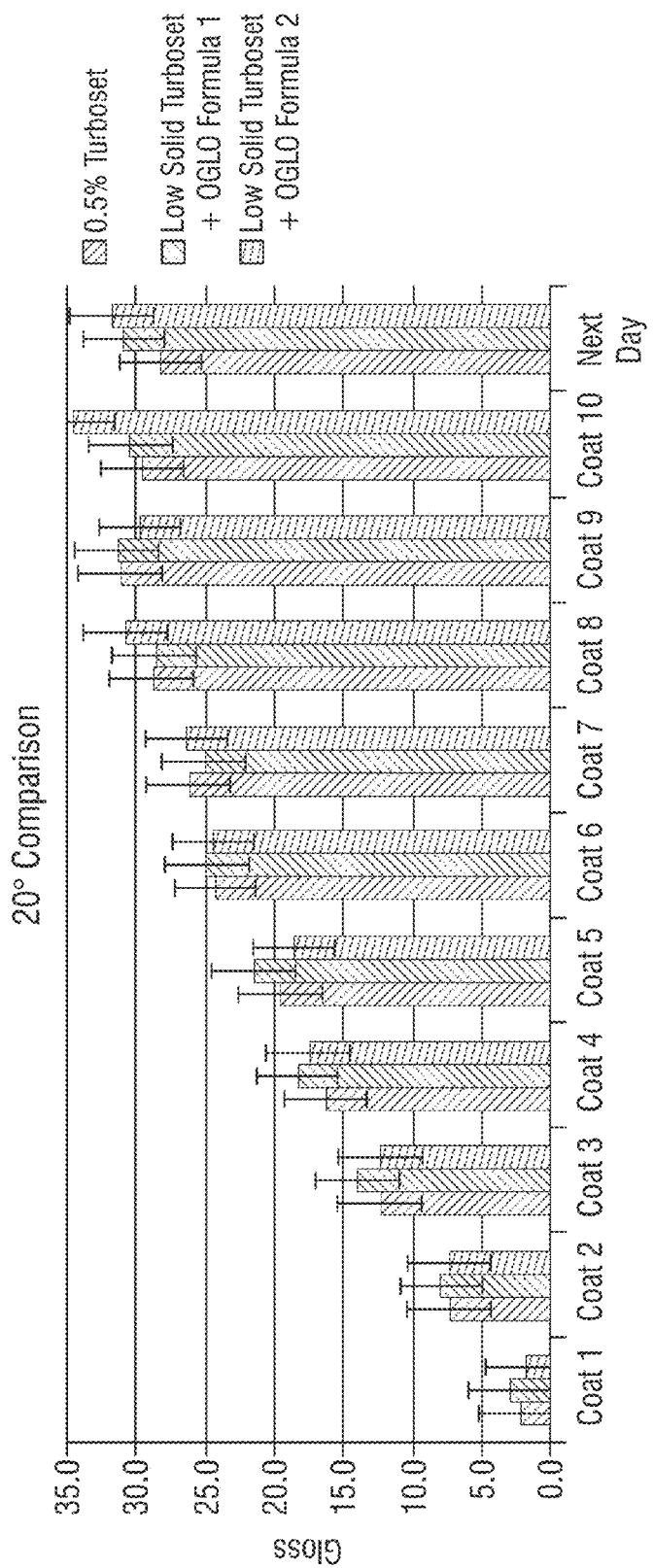
FIG. 12 shows a comparison of the twenty degree gloss measurements for three different 5% solids Turboset formulations.
Figure 13:
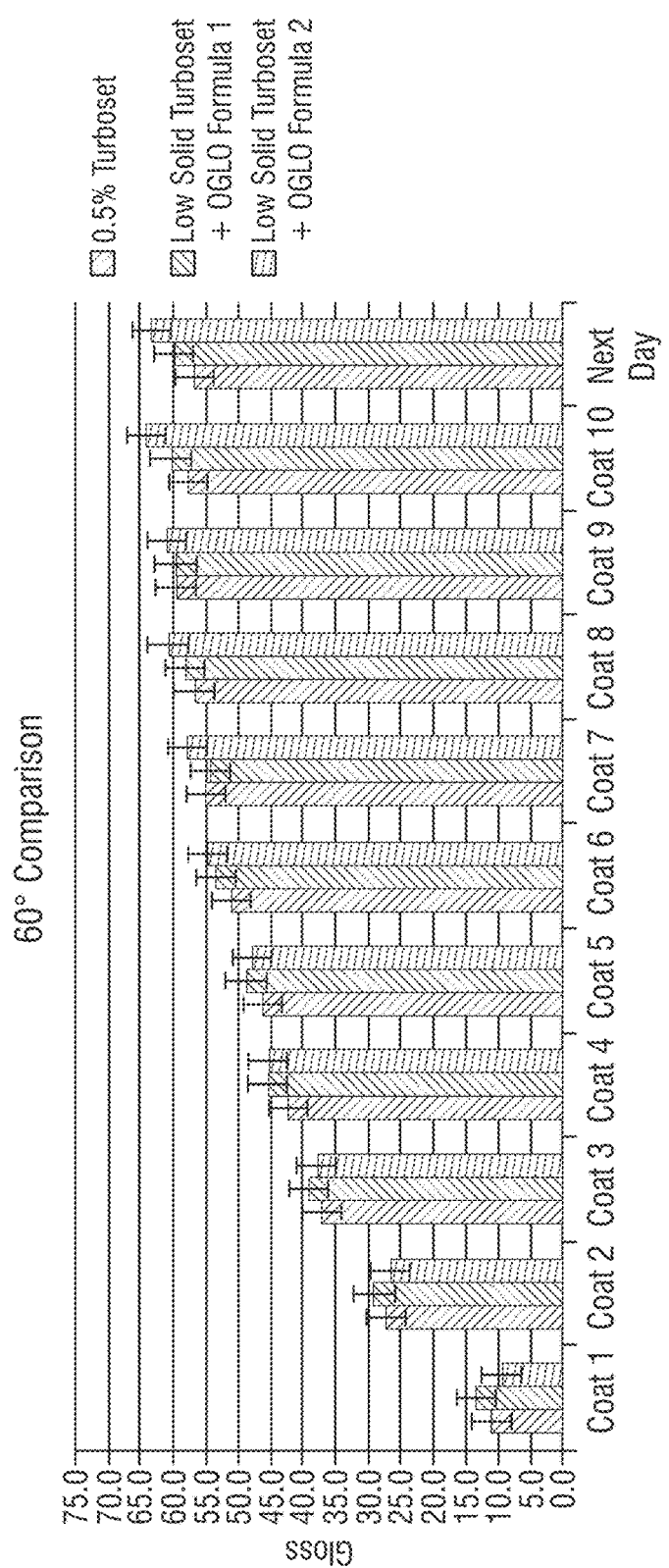
FIG. 13 shows a comparison of the sixty degree gloss measurements for three different 5% solids Turboset formulations.
Figure 14:
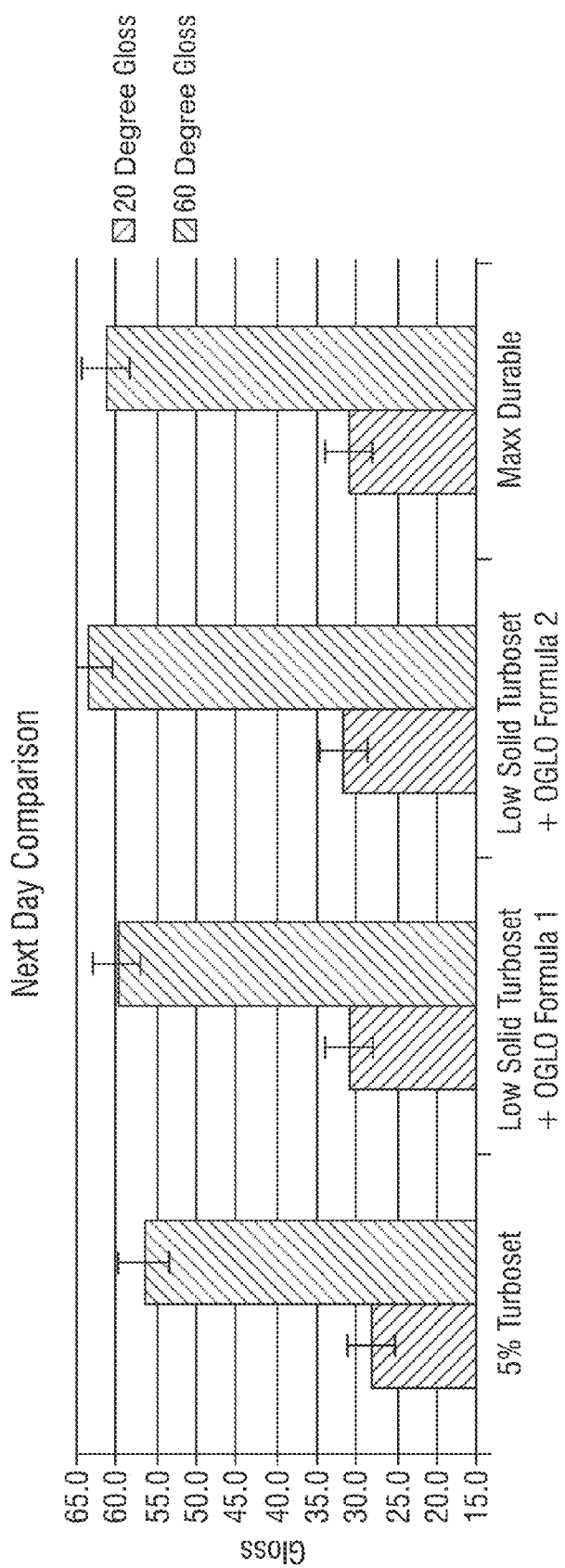
FIG. 14 shows a comparison of the gloss measurements for three different 5% solids Turboset formulations and a commercially available floor coating composition one day after the application of the coating compositions.

Two black VCT tiles were scrubbed and allowed to dry. Each tile was then divided in half and labeled for a unique solution. Each half was then coated with 1.0 gram of the appropriate solution, which was spread evenly on it. The coating was then dried for at least 30 minutes before the gloss (n=5) was measured as in previous examples. Coat 5 was allowed to dry for over one hour and a measure was taken after each of the ten coats as well as the next day for both sets of tiles. The results are shown in Tables 20-22 and FIGS. 12-14.

TABLE 20

| 20° Comparison | 5% Turboset | Low Solid Turboset + OGLO Formula 1 | Low Solid Turboset + OGLO Formula 2 |
|---|---|---|---|
| Coat 1 | 2.3 ± 0.4 | 3.0 ± 0.3 | 1.9 ± 0.4 |
| Coat 2 | 7.5 ± 0.7 | 8.0 ± 1.2 | 7.4 ± 1.8 |
| Coat 3 | 12.4 ± 0.7 | 14.0 ± 2.1 | 12.4 ± 1.8 |
| Coat 4 | 16.3 ± 1.3 | 18.4 ± 1.7 | 17.5 ± 2.2 |
| Coat 5 | 19.6 ± 2.8 | 21.5 ± 1.5 | 18.6 ± 1.7 |
| Coat 6 | 24.3 ± 1.9 | 25.0 ± 1.9 | 24.5 ± 2.6 |
| Coat 7 | 26.3 ± 1.2 | 25.1 ± 2.6 | 26.4 ± 2.9 |
| Coat 8 | 28.9 ± 2.4 | 28.7 ± 1.9 | 30.8 ± 2.9 |
| Coat 9 | 31.2 ± 1.1 | 31.4 ± 4.2 | 29.8 ± 3.5 |
| Coat 10 | 29.6 ± 1.8 | 30.5 ± 3.0 | 34.6 ± 3.0 |
| Next Day | 28.3 ± 2.2 | 30.9 ± 2.5 | 31.8 ± 3.0 |

TABLE 21

| 60 Degree Comparison | 5% Turboset | 5 Low Solid Turboset + OGLO Formula 1 | Low Solid Turboset + OGLO Formula 2 |
|---|---|---|---|
| Coat 1 | 11.0 ± 1.3 | 13.6 ± 0.8 | 9.5 ± 2.2 |
| Coat 2 | 27.4 ± 1.6 | 29.1 ± 1.9 | 26.7 ± 4.1 |
| Coat 3 | 37.3 ± 0.9 | 39.2 ± 2.0 | 37.9 ± 2.6 |
| Coat 4 | 42.4 ± 1.7 | 45.5 ± 2.0 | 45.4 ± 2.2 |
| Coat 5 | 46.3 ± 2.7 | 48.9 ± 2.1 | 47.9 ± 2.1 |
| Coat 6 | 51.2 ± 2.0 | 53.6 ± 1.9 | 54.7 ± 3.0 |
| Coat 7 | 54.9 ± 0.9 | 54.2 ± 3.7 | 57.9 ± 3.2 |
| Coat 8 | 56.8 ± 1.4 | 58.3 ± 2.5 | 60.8 ± 2.5 |
| Coat 9 | 59.6 ± 1.1 | 59.6 ± 3.0 | 60.9 ± 1.9 |
| Coat 10 | 57.7 ± 1.7 | 60.4 ± 2.3 | 64.3 ± 2.1 |
| Next Day | 56.6 ± 1.9 | 59.8 ± 2.0 | 63.5 ± 2.9 |

TABLE 22

| Next Day Comparison | 20° Gloss | 60° Gloss | Final Finish Appearance |
|---|---|---|---|
| Low Solid Turboset Formula 2 | 28.3 ± 2.2 | 56.6 ± 1.9 | Generally level, but with drying ridges mostly at edges |
| Low Solid Turboset + OGLO Formula 1 | 30.9 ± 2.5 | 59.8 ± 2.0 | Visible drying ridges over entire tile |
| Low Solid Turboset + OGLO Formula 2 | 31.8 ± 3.0 | 63.5 ± 2.9 | Worst Ridges and white spots from recoat attack |
| Maxx Durable | 30.9 ± 3.3 | 61.2 ± 1.6 | Great leveling for entire tile |

Overall the addition of OGLO 100 was found to slightly increase the gloss of a 5% Turboset formula as 10 coats of Low Solids Turboset Formula 2 had the same gloss at 5 coats of Maxx Durable. Thus, in some embodiments it appears the presence of OGLO can increase the gloss of the low solid floor coating. However, the final appearance was different because it did not dry as fast as Low Solids Turboset Formula 2, leaving drying ridges and recoat attack.

Example 9

Titration of Butyl Carbitol in 5% Turboset Formula

Example 9 evaluated what level of solvent Butyl Carbitol provided the best gloss, leveling, and fastest dry time in 5% Turboset floor finish.

Four solutions were created: a 1.5 liter sample of 5% Turboset with 1.0% Butyl Carbitol, and separate 100 mL samples of 5% Turboset with 0.5%, 1.5%, and 2.0% Butyl Carbitol. The formulas are shown in Table 23.

TABLE 23

| Ingredients | 0.5% Solvent | 1.0% Solvent | 1.5% Solvent | 2.0% Solvent |
|---|---|---|---|---|
| Water | 86.89 g | 1295.85 g | 85.89 g | 85.39 g |
| Turboset 2027 | 12.50 g | 187.50 g | 12.50 g | 12.50 g |
| Butyl Carbitol | 0.50 g | 15.00 g | 1.50 g | 2.00 g |
| BYK 347 | 0.11 g | 1.65 g | 0.11 g | 0.11 g |

Figure 15:
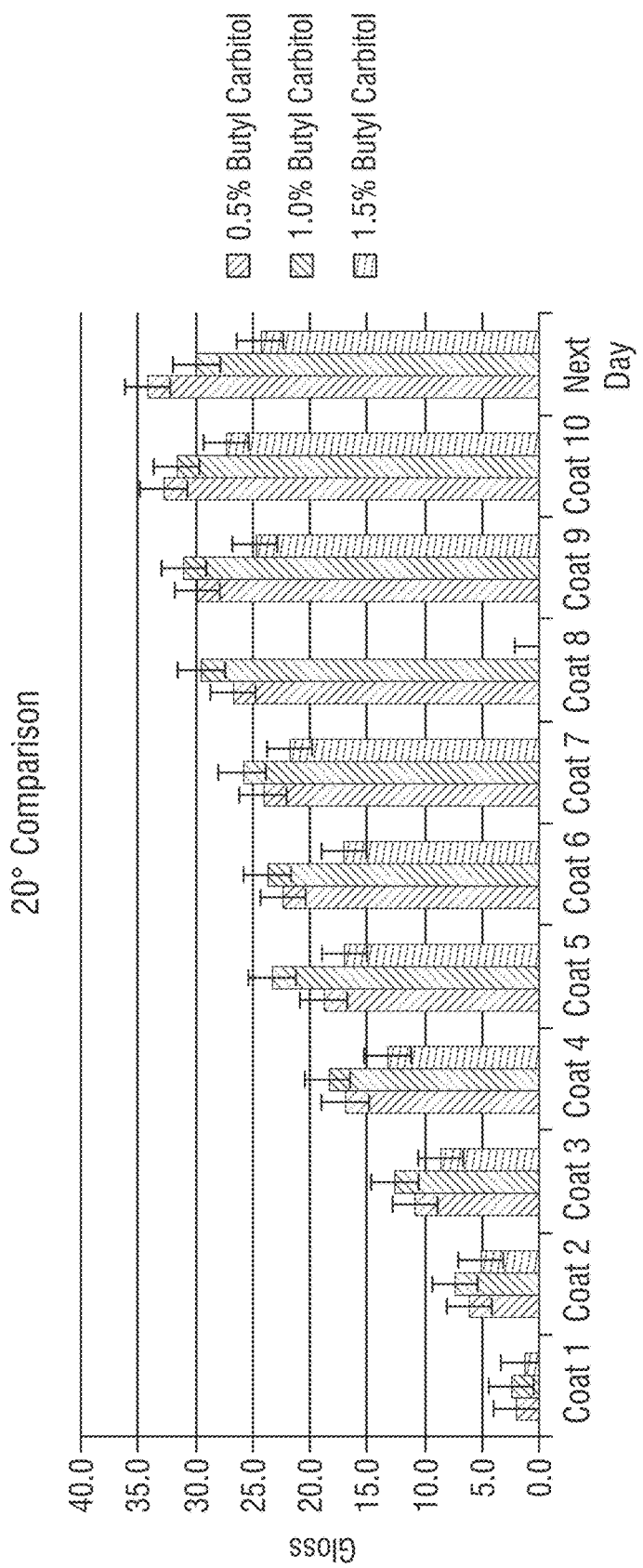
FIG. 15 shows the twenty degree gloss measurements for an exemplary embodiment of the low solids surface coating compositions with varying amounts of solvent after the application of numerous coatings.
Figure 16:
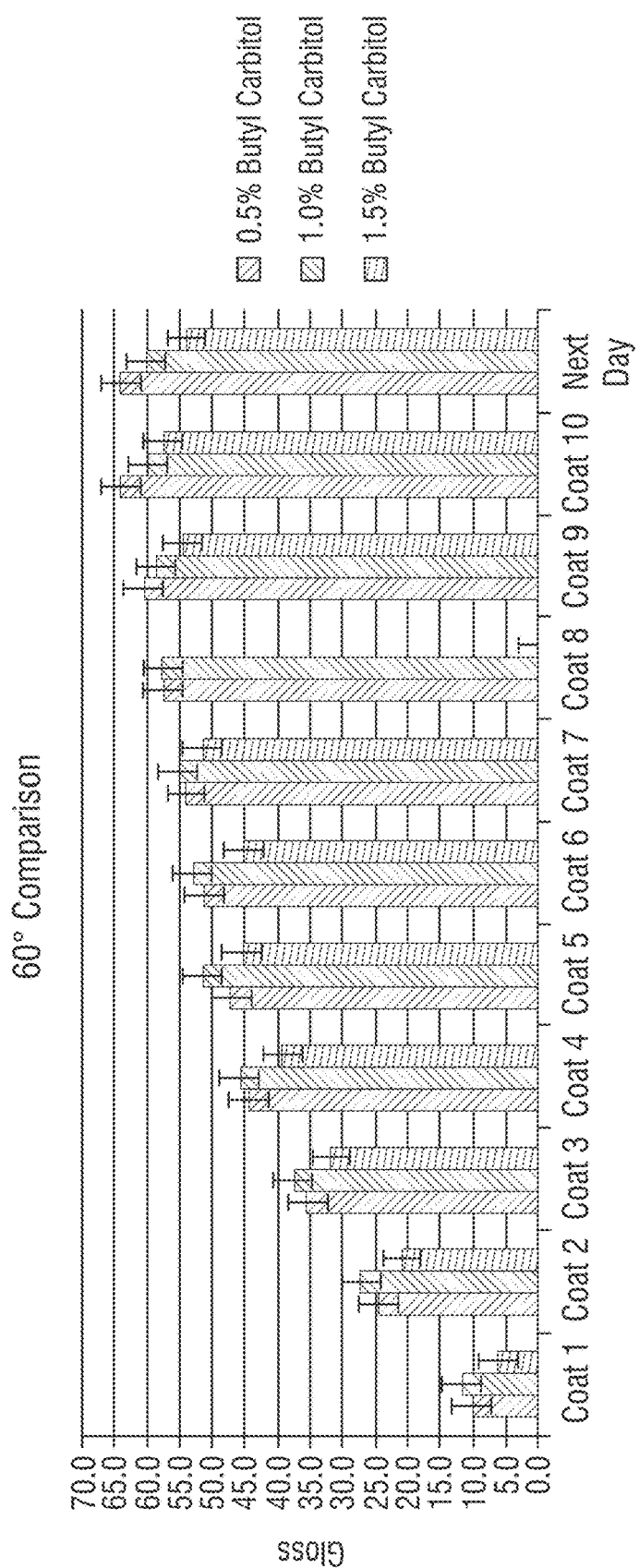
FIG. 16 shows the sixty degree gloss measurements for an exemplary embodiment of the low solids surface coating compositions with varying amounts of solvent after the application of numerous coatings.
Figure 17:
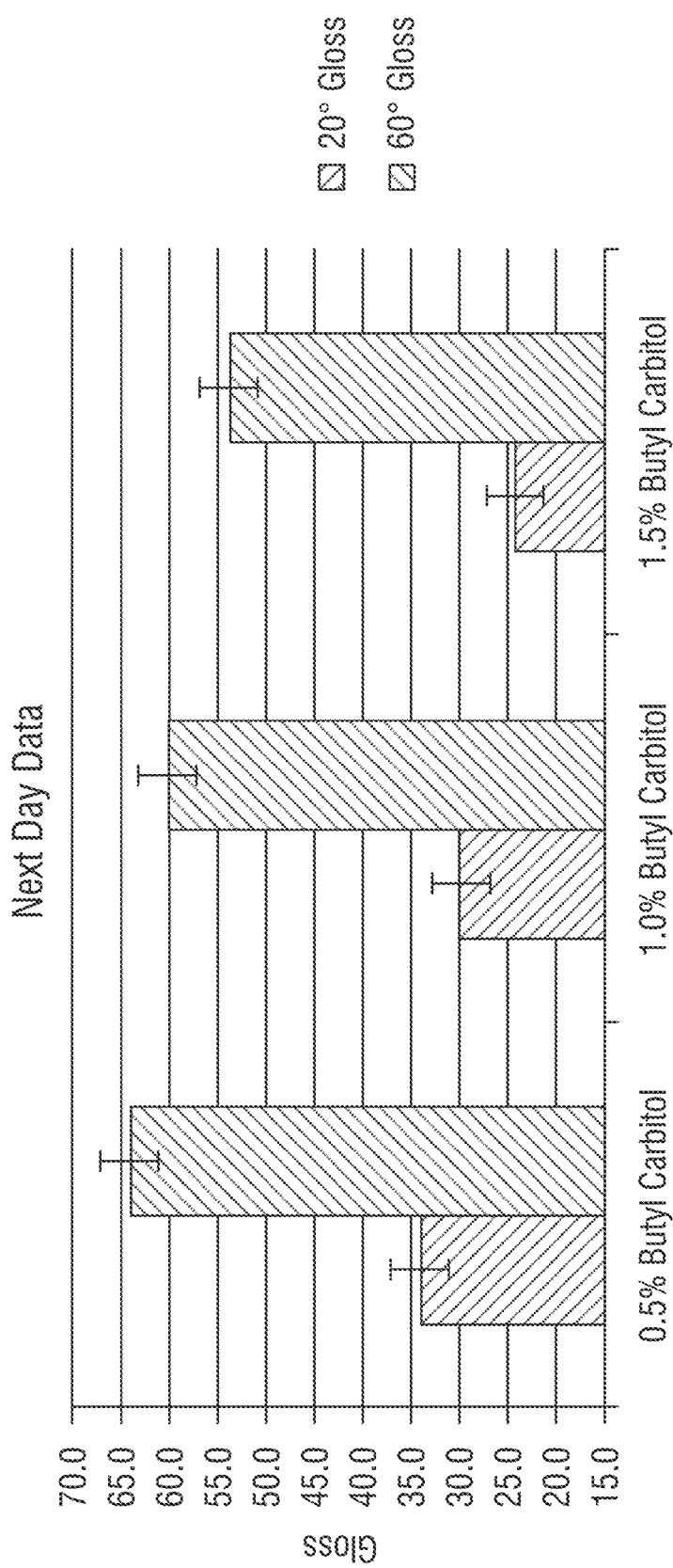
FIG. 17 shows the gloss measurements for an exemplary embodiment of the low solids surface coating compositions with varying amounts of solvent one day after the application of coating compositions.

Two black VCT tiles were scrubbed and allowed to dry. Each tile was then divided in half and labeled for a unique solution. Each half had 1.0 gram of the appropriate solution coated and spread evenly on it. The coating was then allowed to dry for at least 30 minutes before the gloss (n=5) was measured as in previous examples. Coat 5 was allowed to dry for over one hour and a measurement was taken after each of the ten coats as well as the next day for both sets of tiles. The results are shown in Tables 24-25 and FIG. 15-17.

TABLE 24

| 20° Comparison | 0.5% Butyl Carbitol | 1.0% Butyl Carbitol | 1.5% Butyl Carbitol |
|---|---|---|---|
| Coat 1 | 1.9 ± 0.5 | 2.3 ± 0.4 | 1.2 ± 0.6 |
| Coat 2 | 6.1 ± 1.3 | 7.3 ± 0.7 | 5.0 ± 0.3 |
| Coat 3 | 10.8 ± 1.6 | 12.6 ± 1.2 | 8.5 ± 1.2 |
| Coat 4 | 16.9 ± 1.3 | 18.4 ± 1.0 | 13.2 ± 1.9 |
| Coat 5 | 18.8 ± 2.5 | 23.3 ± 1.7 | 17.0 ± 2.0 |
| Coat 6 | 22.4 ± 2.0 | 23.7 ± 1.3 | 17.0 ± 1.1 |
| Coat 7 | 24.1 ± 2.4 | 26.0 ± 2.1 | 21.8 ± 2.2 |
| Coat 8 | 26.7 ± 2.5 | 29.5 ± 2.3 | — |
| Coat 9 | 29.8 ± 2.7 | 31.1 ± 2.9 | 24.8 ± 1.7 |
| Coat 10 | 32.8 ± 1.4 | 31.7 ± 2.4 | 27.3 ± 2.8 |
| Next Day | 34.2 ± 3.5 | 29.9 ± 2.6 | 24.3 ± 1.5 |

TABLE 25

| 60° Comparison | 0.5% Butyl Carbitol | 1.0% Butyl Carbitol | 1.5% Butyl Carbitol |
|---|---|---|---|
| Coat 1 | 10.1 ± 1.7 | 11.7 ± 1.7 | 6.2 ± 2.5 |
| Coat 2 | 24.5 ± 2.9 | 27.2 ± 1.9 | 20.9 ± 1.0 |
| Coat 3 | 35.5 ± 2.2 | 37.6 ± 1.8 | 31.8 ± 1.8 |
| Coat 4 | 44.5 ± 2.3 | 45.8 ± 1.4 | 39.2 ± 2.2 |
| Coat 5 | 47.2 ± 3.3 | 51.4 ± 1.5 | 45.4 ± 1.7 |
| Coat 6 | 51.2 ± 2.8 | 52.9 ± 1.7 | 45.2 ± 0.8 |
| Coat 7 | 54.0 ± 2.2 | 55.2 ± 2.0 | 51.4 ± 2.1 |
| Coat 8 | 57.6 ± 2.3 | 57.7 ± 1.2 | — |
| Coat 9 | 60.6 ± 3.0 | 58.7 ± 1.8 | 54.6 ± 1.3 |
| Coat 10 | 64.1 ± 1.5 | 59.9 ± 2.7 | 57.5 ± 3.3 |
| Next Day | 64.1 ± 2.9 | 60.3 ± 2.8 | 54.0 ± 1.8 |

Overall both 0.5% Butyl Carbitol and 1.0% Butyl Carbitol were found to be preferred, with other concentrations also being useable. 2.0% Butyl Carbitol never formed a film but rather pooled on the tile and dried slowly on the tile in an unusable film. 1.5% Butyl Carbitol had major dry lines and did not have good leveling and showed some pooling as well. Both 0.5% Butyl Carbitol and 1.0% Butyl Carbitol formed a similarly level film and did not look significantly different. 0.5% Butyl Carbitol had a higher visible gloss. All of the finishes, except 2.0% Butyl Carbitol, had similar drying times. Overall both 0.5% Butyl Carbitol and 1.0% Butyl Carbitol provided similar results. 2.0% Butyl Carbitol was unusable as it never formed a film.

Example 10

Spray-Able 5% Turboset Proof of Concept Tests

Example 10 provided quantitative tests to determine how 5% Turboset leveled and affected the gloss when sprayed through an Ecolab Pump-up Foamer/Sprayer onto tiles. Two different 1.5 liter 5% Turboset finishes were created for this experiment. One contained an Tego Glide 410 to provide additional leveling properties. Both samples were stirred for at least one hour after all the components were added and were then bottled overnight before use. The compositions are found in Table 26.

TABLE 26

| | Low Solids Turboset Formula 2 | | Low Solids Turboset Formula 3 | |
|---|---|---|---|---|
| Ingredients | Mass | Wt-% | Mass | Wt-% |
| Water | 1295.85 g | 86.39 | 1294.20 g | 86.28 |
| Turboset 2027 | 187.50 g | 12.5 | 187.50 g | 12.5 |
| Butyl Carbitol | 15.00 g | 1.00 | 15.00 g | 1.00 |
| BYK 347 | 1.65 g | 0.11 | 1.65 g | 0.11 |
| Tego Glide 410 | — | — | 1.65 g | 0.11 |

Spraying on Coated Tiles with Low Solids Turboset Formula 2

The sprayer was loaded with the Low Solids Turboset Formula 2 sample and was used to coat a section of vinyl composite tiles to determine the length of the dry time. It was determined that it took about 40 minutes, in ambient conditions, for the section to dry completely. Some sections of the of the floor dried sooner than the others because the finish did not level completely, but rather the finish formed beads on the surface of the tile and the finish dried in a speckled pattern. This was seen for each coat of the sprayer with additional coatings having a better final appearance because the beading/speckling was random and was not uniform for each coat. Despite the beading the sprayer covered an entire section of the lab floor (24 ft by 6 ft) easily and quickly in less than 10 minutes without refilling or additional pumping. It was determined that an additional leveling agent was preferred.

Spraying on Coated Tiles with Low Solids Turboset Formula 3

After the Low Solids Turboset Formula 3 finish was created, it was sprayed on a another section of vinyl composite tiles. However, the finish did show pooling similar to the 5% Turboset with 2.0% Butyl Carbitol. The pooling seen here was not as severe, but it was concluded that the finish contained too much solvent. Despite the pooling, the finish dried in about 40 minutes and the sprayer performed the same as with Low Solids Turboset Formula 2. Additionally, the finish showed a small gloss increase (2-4 points for all degree angles) similar to that seen with 5% Turboset.

Uncoated Tiles with Robotic Spraying and Application of Low Solids Turboset Formula 3

Using a robotic coating machine and an uncoated floor, Low Solids Turboset Formula 3 was applied to a floor. This was done by using the sprayer and light pressure on a small microfiber pad that followed along the sprayed area. Using this method, the Low Solids Turboset Formula 3 dried in about 20 minutes and showed a noticeable visual difference from the uncoated tiles. The gloss increase was only around 1-2 points, but the same gloss increase was seen for both the first and second coat done with the robot.

The inventions being thus described, it will be obvious that the same may be varied in many ways. Such variations are not to be regarded as a departure from the spirit and scope of the inventions and all such modifications are intended to be included within the scope of the following claims.

What is claimed is:

1. A method of treating a surface comprising:
   applying by spraying with a robotic floor coating device a composition comprising between about 1 wt-% and about 15 wt-% of a polymer;
   wherein said polymer comprises a self-crosslinking polyurethane polymer; between about 0.01 wt-% and about 1.7 wt-% of a solvent; between about 0.01 wt-% and about 1 wt-% of a surfactant; and between about 70 wt-% and about 98.98 wt-% of water,
   wherein said composition has a viscosity of 15 cps or less,
   wherein said composition has a solid content of between 5 wt-% and less than 8 wt-%, a shelf life of at least 6 months, and forms a stable and even film without uneven leveling after being applied by spraying to a surface one or more times without a leveling process.

2. The method of claim 1, wherein said surface is a floor.

3. The method of claim 1, further comprising allowing the composition to dry.

4. The method of claim 3, further comprising reapplying the composition.

5. The method of claim 1, wherein said composition has a viscosity of 10 cps or less.

6. The method of claim 1, wherein said solvent comprises a glycol ether.

7. The method of claim 1, wherein said surfactant comprises an organo-fluorine, silicone-based surfactant, and/or silicone emulsion or colloid.

8. The method of claim 1, wherein said solvent comprises mono butyl ether, and wherein said surfactant comprises a siloxane.

9. The method of claim 1, wherein said solvent comprises between about 0.05 wt-% and about 1 wt-% of the composition.

10. The method of claim 1, wherein the composition has a viscosity of 7 cps or less.

11. The method of claim 1, wherein said composition has a shelf life of at least one year.

12. The method of claim 1, said composition further comprising at least one of the following additional functional ingredients: a leveling agent, a wax, a fragrance, a dye, a polish, a corrosion inhibitor, a plasticizer, a fungicide, a biocide, a friction modifier, a metal complex, a rheology modifier, or a thickener.

13. A method of treating a surface comprising:
   applying by spraying with a robotic floor coating device a composition comprising between about 1 wt-% and about 15 wt-% of a polymer, wherein said polymer comprises a self-crosslinking polyurethane polymer;
   between about 0.1 wt-% and about 1 wt-% of a solvent;
   between about 0.07 wt-% and about 0.5 wt-% of a surfactant; and
   between about 70 wt-% and about 98.98 wt-% of water;
   wherein said composition has a viscosity of 15 cps or less,
   wherein said composition has a solid content of between 5 wt-% and less than 8 wt-%, a shelf life of at least 6 months, and forms a stable and even film without uneven leveling after being applied by spraying to a surface one or
   more times and without a leveling process.

14. The method of claim 13, wherein said solvent comprises a glycol ether, and wherein said surfactant comprises an organo-fluorine, silicone-based surfactant, and/or silicone emulsion or colloid.

15. The method of claim 13, wherein said polymer comprises between about 5 wt-% and about 10 wt-% of the composition, and wherein said solvent comprises between about 0.5 wt-% and about 1 wt-% of the composition.

16. The method of claim 13, wherein the composition has a viscosity of 7 cps or less; and/or a shelf life of at least 1 year.

17. The method of claim 13, wherein said surface is a floor.

18. The method of claim 13, further comprising reapplying the composition.

* * * * *

UNITED STATES PATENT AND TRADEMARK OFFICE
CERTIFICATE OF CORRECTION

| | |
|---|---|
| PATENT NO. | : 10,407,591 B2 |
| APPLICATION NO. | : 14/557617 |
| DATED | : September 10, 2019 |
| INVENTOR(S) | : Evan Hendrickson et al. |

Page 1 of 1

It is certified that error appears in the above-identified patent and that said Letters Patent is hereby corrected as shown below:

In the Claims

<u>In Column 22, Claim 16, Line 49:</u>
DELETE "less;"
INSERT --less--

Signed and Sealed this
Nineteenth Day of November, 2019

Andrei Iancu
*Director of the United States Patent and Trademark Office*